(12) United States Patent
Kim

(10) Patent No.: US 7,236,355 B2
(45) Date of Patent: Jun. 26, 2007

(54) SUN VISOR HAVING OFFICE WORK APPARATUS

(76) Inventor: Boyean Kim, No. 101,229-18, Yeannam-dong, Mapo-gu, 121-865, Seoul (KR)

( * ) Notice: Subject to any disclaimer, the term of this patent is extended or adjusted under 35 U.S.C. 154(b) by 218 days.

(21) Appl. No.: 10/435,519

(22) Filed: May 9, 2003

(65) Prior Publication Data

US 2004/0011835 A1 Jan. 22, 2004

Related U.S. Application Data

(63) Continuation-in-part of application No. PCT/KR02/00011, filed on Jan. 4, 2002.

(30) Foreign Application Priority Data

| Jan. 17, 2001 | (KR) | 10-2001-0002763 |
| Dec. 4, 2001 | (KR) | 10-2001-0076339 |
| May 10, 2002 | (KR) | 10-2002-0025760 |
| Feb. 6, 2003 | (KR) | 10-2003-0007528 |

(51) Int. Cl.
*G06F 1/16* (2006.01)
(52) U.S. Cl. ....................... 361/683; 224/312; 296/97.1
(58) Field of Classification Search ................ 224/312; 361/683
See application file for complete search history.

(56) References Cited

U.S. PATENT DOCUMENTS

| 2,904,371 | A | * | 9/1959 | Stec ........................ 296/97.5 |
| 3,016,262 | A | * | 1/1962 | Hunt ........................ 296/97.5 |
| 4,326,100 | A | | 4/1982 | Polacsek |
| 4,706,273 | A | * | 11/1987 | Spear et al. .............. 455/569.2 |
| 4,870,676 | A | * | 9/1989 | Lewo ........................ 455/564 |
| 4,875,229 | A | * | 10/1989 | Palett et al. ............. 455/569.2 |
| 5,177,665 | A | | 1/1993 | Frank et al. |
| 5,301,856 | A | | 4/1994 | Newsome |
| D346,997 | S | * | 5/1994 | Kurtis ........................ D12/176 |
| 5,385,283 | A | * | 1/1995 | Shioda ....................... 224/276 |
| 5,949,474 | A | * | 9/1999 | Gerszberg et al. ........ 348/14.01 |
| 6,062,145 | A | * | 5/2000 | Lin ............................ 108/44 |
| 6,085,078 | A | * | 7/2000 | Stamegna ................... 455/345 |
| 6,174,097 | B1 | * | 1/2001 | Daniel ........................ 400/472 |
| 6,279,800 | B1 | * | 8/2001 | Lee ............................ 224/276 |
| 6,543,832 | B1 | * | 4/2003 | Bogdanski et al. ........ 296/97.1 |
| 6,889,064 | B2 | * | 5/2005 | Baratono et al. .......... 455/569.2 |
| 2003/0151306 | A1 | * | 8/2003 | Weinberger ................ 307/10.1 |

FOREIGN PATENT DOCUMENTS

| DE | 3316818 A1 | * | 11/1984 |
| DE | 019852535 A1 | * | 5/2000 |
| JP | 60203526 | | 10/1985 |
| JP | 10-297380 | * | 4/1997 |
| JP | 10-329618 | * | 5/1997 |
| KR | 20010009364 A | | 2/2001 |
| WO | WO84/04499 | * | 5/1984 |
| WO | WO84/04499 | | 11/1984 |

* cited by examiner

*Primary Examiner*—Anatoly Vortman
*Assistant Examiner*—Anthony Q. Edwards
(74) *Attorney, Agent, or Firm*—Tuchman & Park LLC

(57) ABSTRACT

The present invention relates to a sun visor with a variety of office apparatuses that is capable of handling a user's work in a car. The sun visor with the variety of apparatuses with a keyboard that are mounted in an attachable and detachable manner, such that when the apparatuses are attached on the sun visor, the sun visor functions to prevent the driver's eyes from bright sunshine, and when they are detached therefrom, they can be available on a steering wheel in a car, the sun visor includes a holding frame to which the office work apparatus detachably mounted, and a frame fixing member which installed to a ceiling of a vehicle, the frame fixing member detachably engaging with the holding frame.

6 Claims, 29 Drawing Sheets

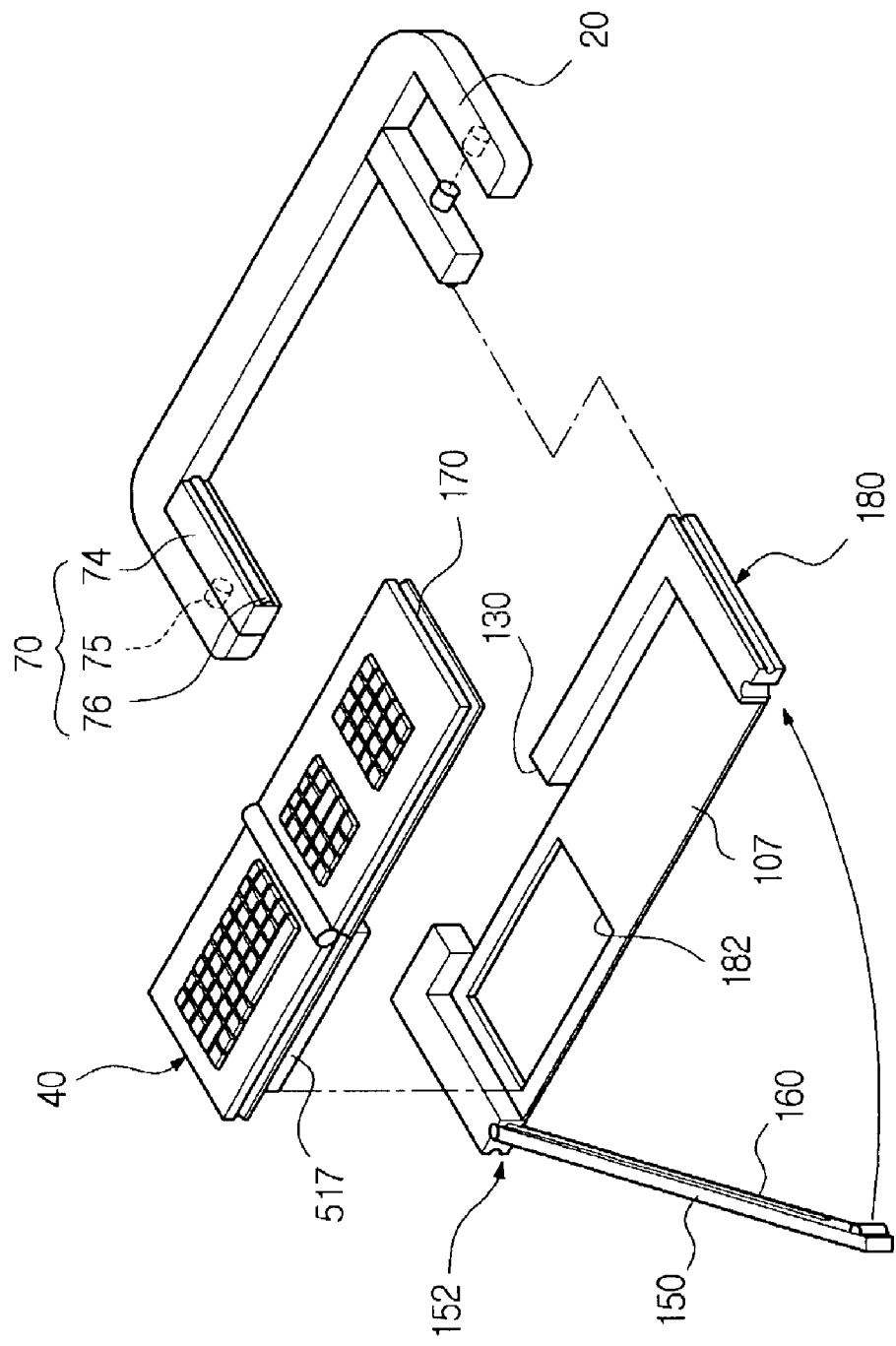

SUN VISOR HAVING OFFICE WORK APPARATUS

PRIORITY CLAIM

This application is a continuation-in-part of the PCT Application No. PCT/KR02/00011, filed Jan. 4, 2002, which is herein incorporated by reference, that claims priority from two Korean Patent Applications No. 2001/2763 filed Jan. 17, 2001 and No. 2001/76339 filed Dec. 4, 2001, each herein incorporated by reference. This application claims the benefit of the filing date of the PCT Application under 35 USC §120. This application also claims priority from Korean Patent Applications No. 2002-25760, filed May 10, 2002, which is herein incorporated by reference, and No. 2003-7528, filed Feb. 6, 2003, which is herein incorporated by reference.

This application is a continuation in part application of the, including U.S. as one of the designated states.

FIELD OF THE INVENTION

The present invention relates to a sun visor with a variety of office apparatuses having functions of Internet, cellular phone, video communication, card accounts, and the like.

BACKGROUND OF THE INVENTION

As well known, one example of conventionally developed apparatuses mounted inside a car are communication equipment, a monitor device, and so on.

On the other hand, another examples are found in the documents, as filed by the same applicant as in the present invention, such as Korean Utility Model Application Nos. 1999-3877 and 1999-6371 and Korean Patent Application Nos. 1999-27706 and 2000-39035, wherein various kinds of apparatuses such as a personal computer, a notebook computer, a keyboard, etc. are mounted in a car such that a user can handle his or her work in the car.

SUMMARY OF THE INVENTION

It is an object of the present invention to provide a sun visor with a variety of office apparatuses that enables a user to handle his or her work in a car and is mounted in an attachable and detachable manner, if necessary, thereby ensuring the convenience in use, which is an improvement of the sun visor as filed by the same applicant.

In order to achieve this and other objects of the present invention, there is provided a sun visor with an office work apparatus which detachably engages with the sun visor. The sun visor includes a holding frame to which the office work apparatus detachably mounted, and a frame fixing member which installed to a ceiling of a vehicle, the frame fixing member detachably engaging with the holding frame.

BRIEF DESCRIPTION OF THE DRAWINGS

The above and other objects and features of the present invention will become apparent from the following description of preferred embodiments given in conjunction with the accompanying drawings, in which:

FIG. 33 shows still another embodiment of the present invention including a carrying member having a modified configuration.

DETAILED DESCRIPTION OF THE PREFERRED EMBODIMENTS

Now, an explanation of the preferred embodiments of the present invention will be described with reference to accompanying drawings.

Figure 1:
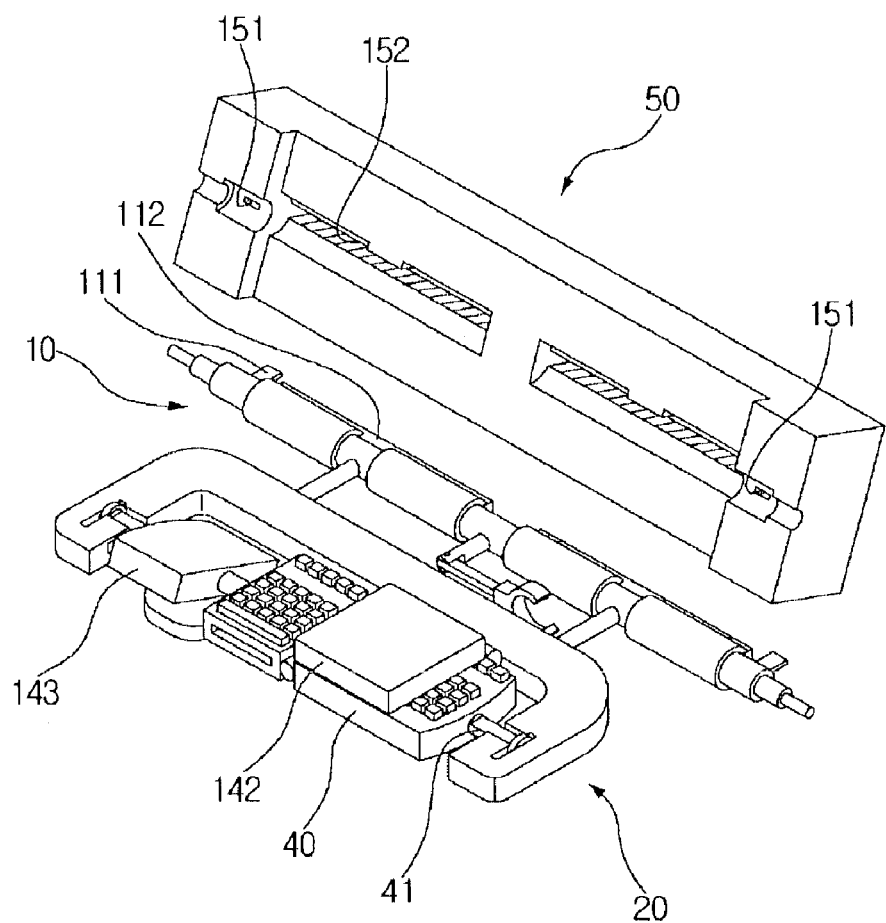
FIG. 1 shows an exemplary view of the whole construction of a sun visor with a variety of office apparatuses according to the present invention.

FIG. 1 shows a structure where a frame 20 with a variety of office apparatuses is coupled in an attachable and detachable manner with a sun visor coupling part 50 by means of a ceiling-connected part 10.

As shown, the sun visor coupling part 50 is provided with a generally long coupling groove 152 thereon and with a relatively small coupling groove 151 on the both sides, respectively. And, the ceiling-connected part 10 is provided with an intensity protrusion 112 that is inserted into the coupling groove 152 of the sun visor coupling part 50 and with a fixed protrusion 111 that is inserted into the small coupling groove 151 of the sun visor coupling part 50, on the both sides, respectively.

The frame 20, which is connected to the ceiling-connected part 10, is equipped with an office equipment 40 such as, for example, a notebook computer or a portable computer with a display 142 such as a monitor and other equipment and with a communication equipment mounting stand 143 on the side portion. At this case, the installation on the frame 20 is carried out by virtue of a shaft 41. The communication equipment mounting stand 143 is provided for mounting a cellular phone on the outside and for mounting on the inside a communication modem card and a wireless LAN card for the wireless function of the office equipment 40, that is, for the Internet wireless LAN function.

Figure 2:
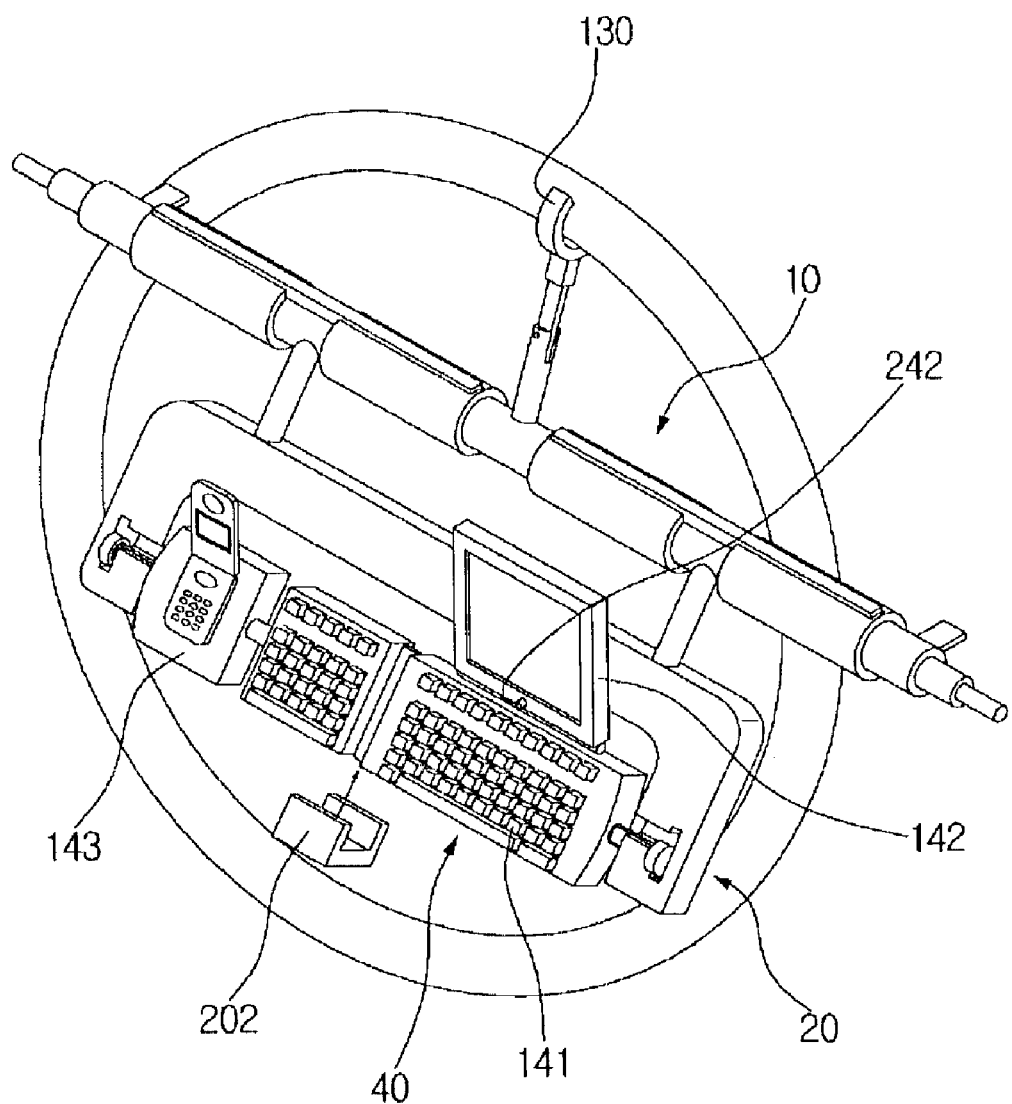
FIG. 2 shows an example for the office apparatuses in use in FIG. 1.

FIG. 2 shows the example of the sun visor in use where the frame 20 and the ceiling-connected part 10 are separated from the sun visor coupling part 50 and are then fixed on a steering wheel by using an insertion bar 130 that is foldable. In this case, the device and parts that have not described in the detailed description of the present invention are well disclosed in the prior arts filed by the same applicant as in this invention, and therefore, an explanation of them will be excluded.

As shown, the office equipment 40 includes a display part 142 and a keyboard part 141, and the display part 142 is provided with a camera part 242 on a predetermined position thereon, with which image chatting can be carried out. And the communication equipment mounting stand 143 holds the cellular phone.

Figure 3A:
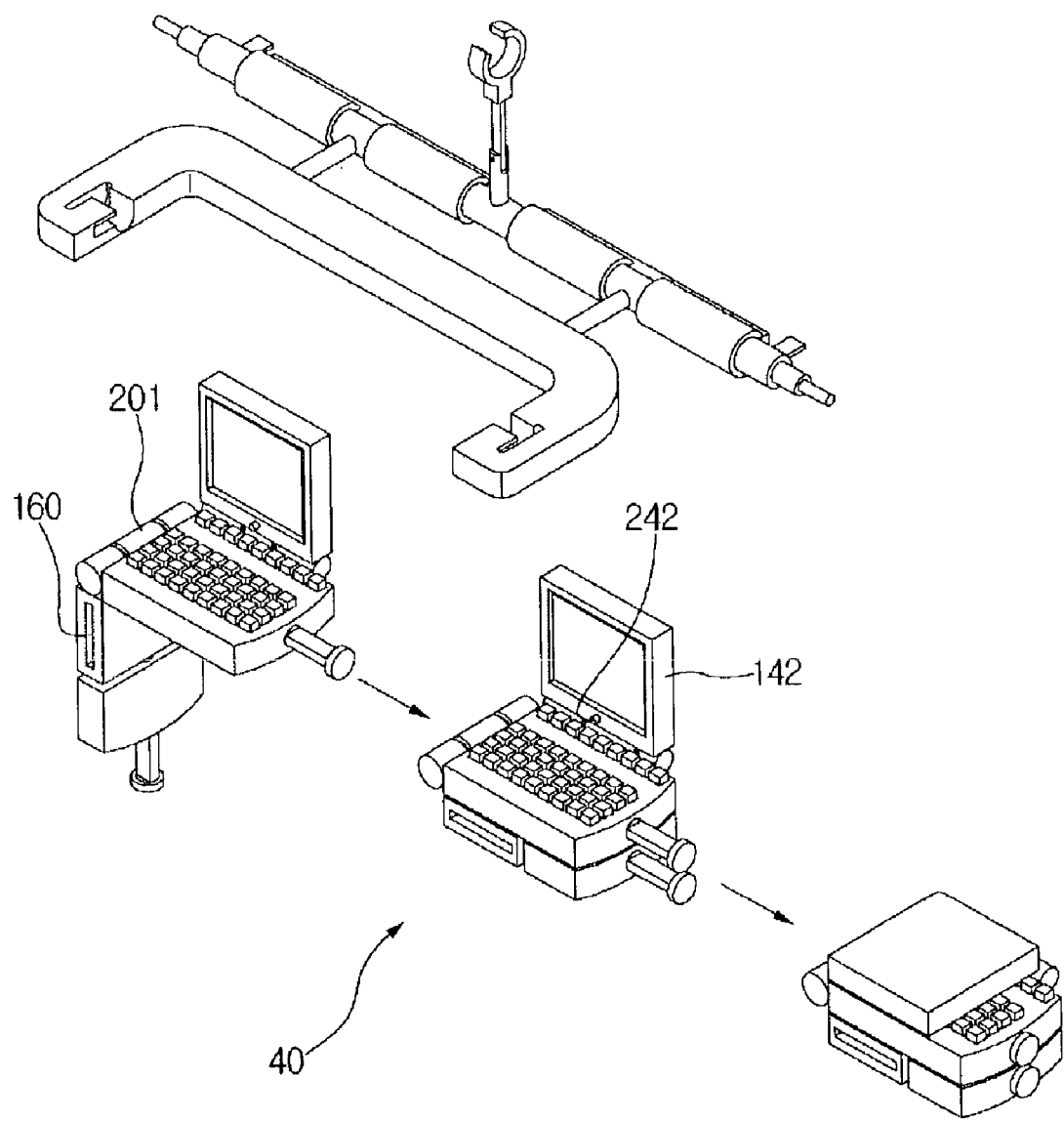
FIG. 3a shows a view for the foldable parts among the office apparatuses in FIG. 1.

FIG. 3a shows the example where only the office equipment 40 is separated and folded.

As shown, the office equipment 40, which is in the unfolded state as shown in FIG. 2, can be folded for the convenience in use. This is reduced in size to half by means of a hinge part 201 and after that, when the display part 142 is folded, this can be reduced in a compact size as shown in the right side in FIG. 3a. In order to prevent the folded part from being falling down at the time when the hinge part 201 is unfolded, there is provided a separate grip 202 that is fixed on the both ends of the folded part, as shown in FIG. 2.

In addition, the keyboard part on the folded part where the office equipment 40 is reduced in size to half is provided with a card insertion hole 160 through which a card is inserted to conduct accounts on Internet.

Figure 3B:
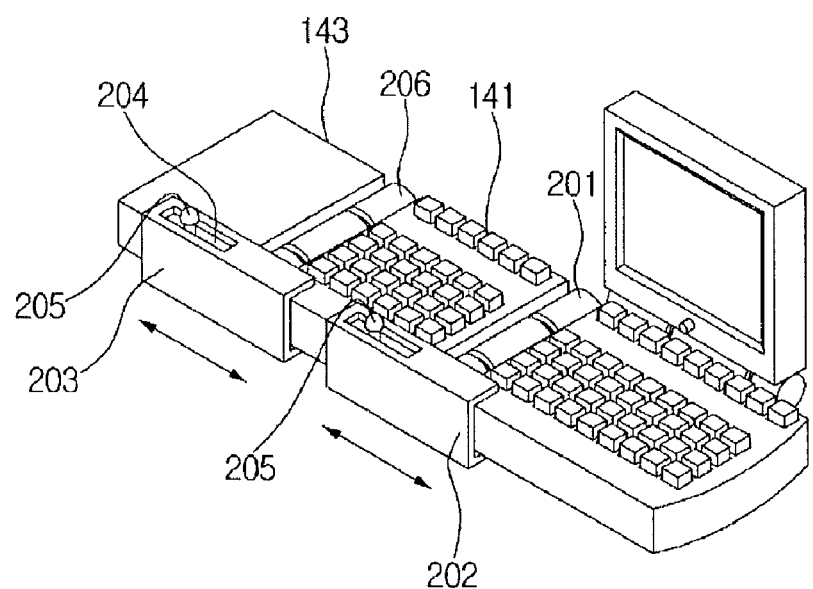
FIG. 3b shows another embodiment of the grip in FIG. 2.

FIG. 3b shows another embodiment of the grip 202 in FIG. 2.

In this embodiment, there is provided a second hinge part 206 between the communication equipment mounting stand 143 and the keyboard part 141, and a grip 203 is provided with a relatively long groove 204. On the upper or lower portion of the communication equipment mounting stand 143 or the keyboard part 141, there is provided a guide 205 that guides the grip 203 along the long groove 204. If the guide 205 was disposed on the lower portion of the grip 203 unlike the drawing, the long groove 204 would be formed on the bottom portion of the grip 203.

Under the above construction, the office equipment 40, the communication equipment mounting stand 143 and the keyboard part 141 can be all used, without any separation or falling down.

Figure 4:
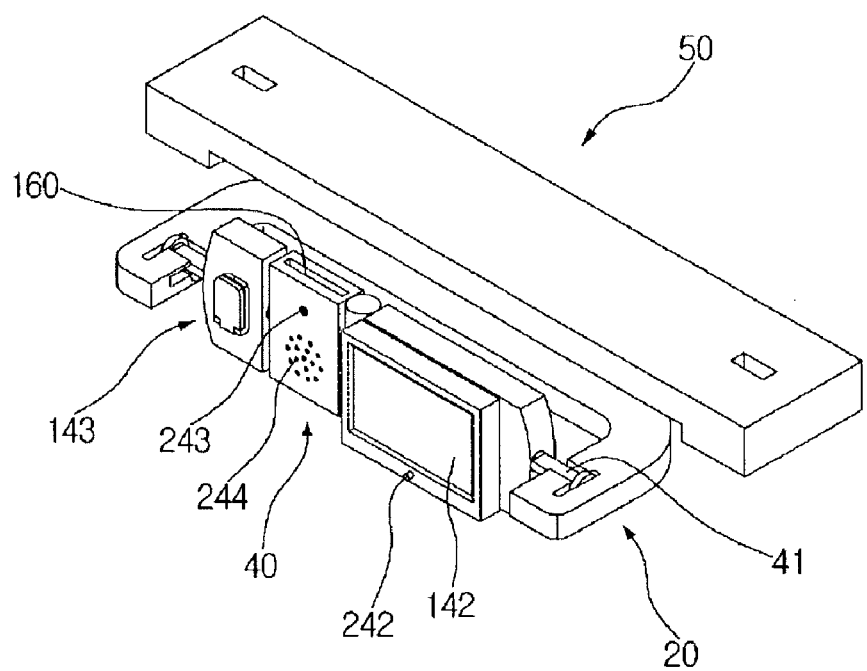
FIG. 4 shows another example for the office apparatuses in use in FIG. 1.

As shown in FIG. 4, the ceiling-connected part 10 and the frame 20, as exploded in FIG. 1, are all coupled to the sun visor coupling part 50, such that a user can carry out image communication in a driver's seat.

At that time, the sun visor is disposed at such an angle that is appropriate for the image communication. As shown, in other words, the frame 20 stands vertically, and the keyboard part 141 as shown in FIG. 2 is rotated back around the shift 41. Next, the display part 142 is fully folded back. The result is shown in FIG. 4. At this state, the card insertion hole 160 is disposed upward, and the bottom surface thereof is toward the front side. The card insertion hole 160 is provided with a mike 243 and a speaker 244 on the bottom surface.

Thereby, the user can communicate with the person on the display part, while sitting on the driver's seat.

At that time, the communication equipment mounting stand 143 and the office equipment 40 are electrically connected to each other. For example, the call incoming by a cellular phone can be processed to the image communication by the communication equipment mounting stand 143 and the mike 243, the speaker 244, the display part 142, and the camera 242 respectively connected electrically to the communication equipment mounting stand 143.

In other words, all sources (signals and data) of communication (transmission and reception) of the communication equipment mounting stand 143, the inside part thereof, the outside cellular phone, and the inside communication module are used by the above-mentioned parts that are electrically and communicatively connected thereto.

Figure 5:
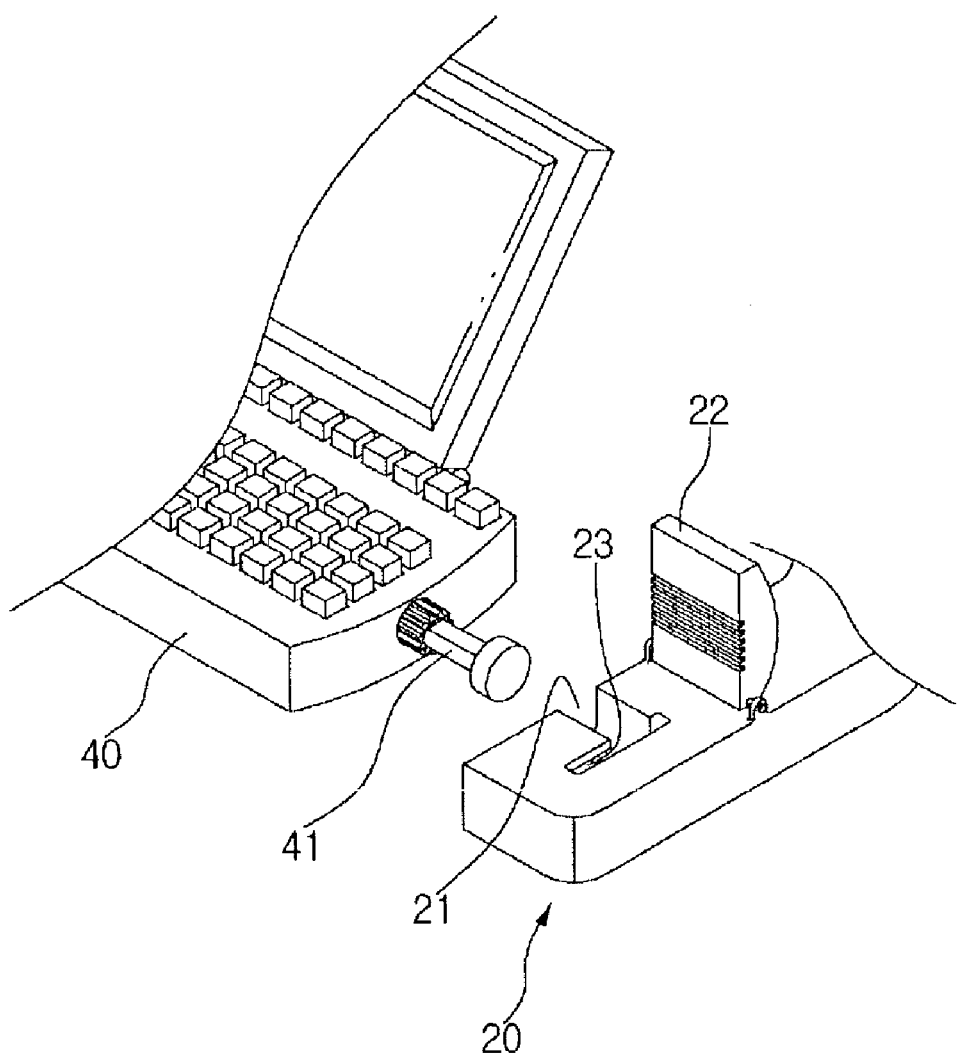
FIG. 5 shows the coupling of the shaft into the frame in FIG. 1.

FIG. 5 shows the structure of the shaft 41 coupled to the frame 20.

The frame 20 is provided with a groove 21 into which the shaft 41 is inserted. The groove 21 is extended to a generally long groove 23. Of course, it is possible that there is no need for the formation of the long groove 23.

That is, the shaft 41, which is formed on the side of the office equipment 40 on which various equipments are mounted, is inserted into the groove 21. The groove 21 formed on the frame 20 is provided with a flap 22 that covers the groove 21 after insertion of the shaft 41, on the top portion. The shaft 41 inserted into the groove 21 is further pushed into the long groove 23 such that the shaft 41 and the office equipment 40 are firmly fixed without further development of rotation. Desirably, the long groove 23 becomes narrow in depth, as it gets deeper. This enables the shaft 41 to be rigidly fixed. The shaft 41 is fixed as a unitary body with the office equipment 40 and moved together therewith.

Figure 6:
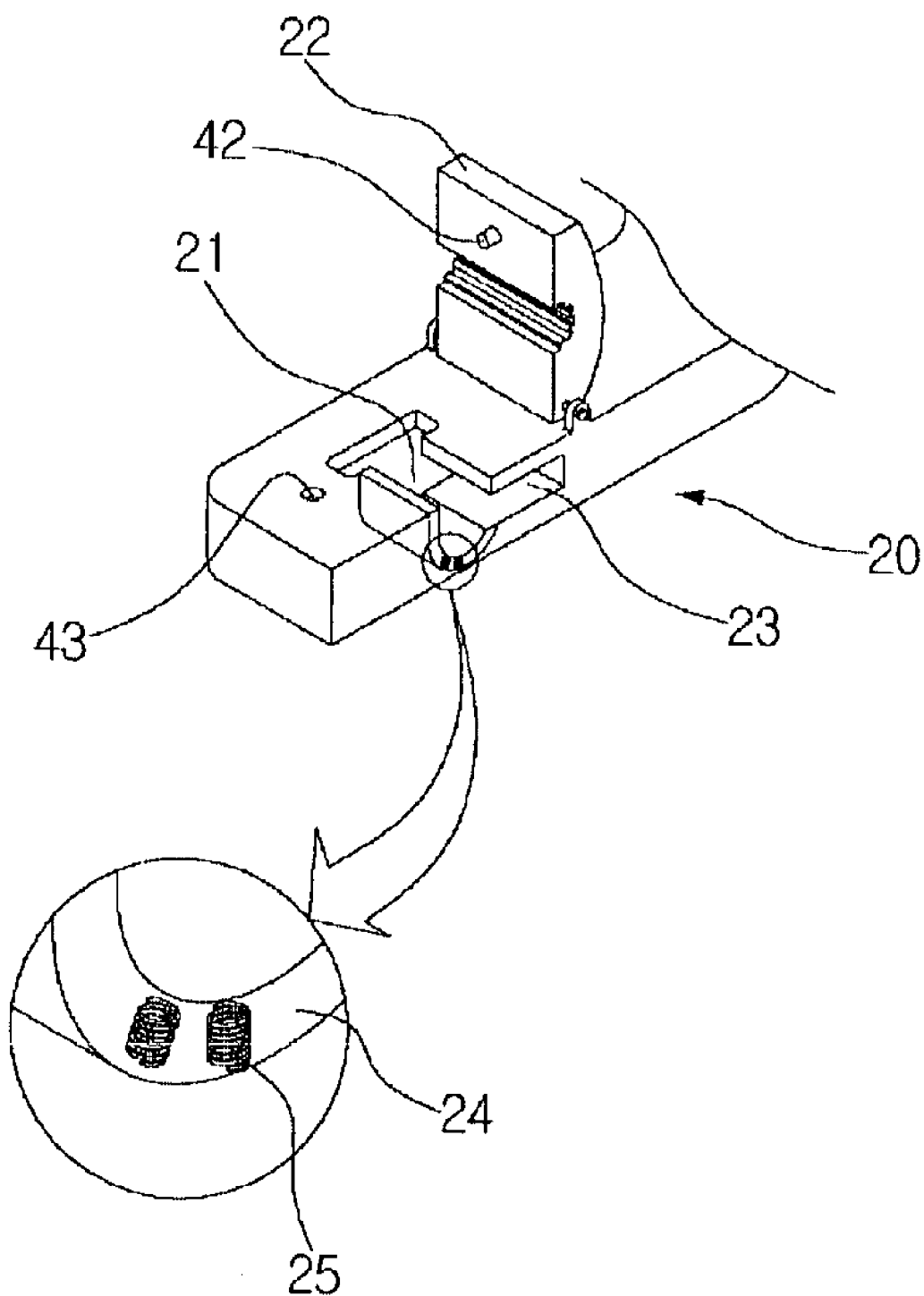
FIG. 6 shows another embodiment of FIG. 5.

FIG. 6 shows another embodiment of the structure of the shaft 41 in FIG. 5.

In this embodiment, the groove 21 includes an elastic part 24 with elasticity or with one or more springs 25 therein.

This allows the installation of the shaft 41 to be made with ease as well as protects the office equipment 40 from impacts or shaking.

Also, the flap 22 is provided with a protrusion 42, and the frame 20 is provided with a groove 43 on the corresponding position to the protrusion 42. If the flap 22 is covered on the frame 20, the protrusion 41 is fitted to the groove 43 such that the flap 22 can be fixed on the frame 20.

Figure 7:
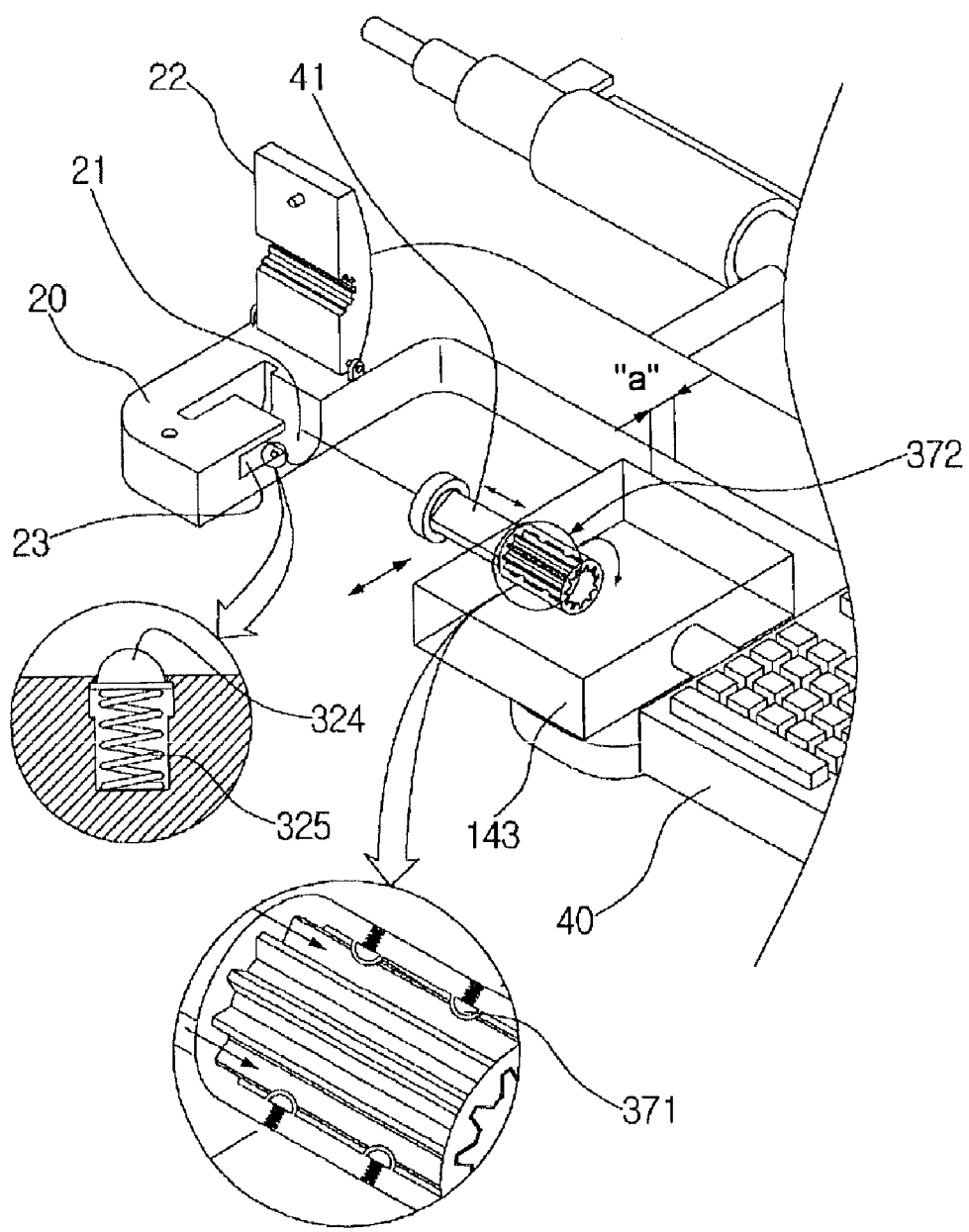
FIG. 7 shows still another embodiment of FIGS. 5 and 6.

FIG. 7 shows still another embodiment of the structure of the shaft 41 in FIGS. 5 and 6.

In this embodiment, the long groove 23 is formed downward unlike the embodiment of FIG. 6. The long groove 23 is provided with a projection 324 and a spring 325 on the beginning portion. The shaft 41 is not of a cylindrical shape but a bar shape that is cut on the one parts, as shown. The shaft 41 on each of the sides of the communication equipment mounting stand 143 and the office equipment 40 is connected with a casing 372 that is provided with an elastic body 371 like the assembly of the projection 324 and the spring 325 in the inner diameter. The shaft 41 part connected to the casing 372 takes a similar shape to the shape of the inner diameter of the casing 372 with a result that the shaft 41 can push or pull to/from the casing 372. In this case, the elastic body 371 serves to guide the movement of the shaft 41 in the length direction as well as control the rotation around the shaft 41 by predetermined angles in steps. In this case, two elastic bodies 371 are disposed to face with each other on the front and back portions in a circumferential direction such that four or more or four or less elastic bodies 371 can be formed.

Thereby, the vibration and shaking which may be transmitted by the shaft 41 can be desirably prevented.

In operation, the communication equipment mounting stand 143 and the office equipment 40 that are mounted on the frame 20 cannot rotate in the state where the shaft 41 is inserted into the groove 21. The reason is that the interval (which is shown as 'a' in FIG. 7) between the upper portion of the frame 20 and the stand 143 and the office equipment 40 is extremely small such that the stand 143 and the office equipment 40 bump into the upper portion of the frame 20. Under the above state, if the assembling parts of the frame 20 are coupled with the sun visor coupling part 50, the sun visor has a function of preventing the driver's eyes from bright sunshine.

If the shaft 41 pulls downward, it presses the projection 324 on the side of the groove 21 and entered the inside of the long groove 23. Thereby, the interval 'a' becomes large with a result that the stand 143 and the office equipment 40 rotate to a desired angle convenient to use around the shaft 41. On the other hand, the shaft 41 takes a flat shape with the upper side slightly inclined, and even if the shaft 41 is inserted into the long groove 23, it cannot rotate. That is, the shaft 41 rotates only when the shaft 41 with the inclined upper side should stand vertically, which needs to forcibly press the shaft 41 over the height of the long groove 23. By these reasons, the shaft 41 cannot rotate in the long groove 23.

Therefore, the communication equipment mounting stand 143 and the office equipment 40 that are mounted on the shaft 41 are rotated in the casing 372. In other words, the equipment connected as a unitary body with the casing 273 is rotated around the shaft 41.

Figure 8:
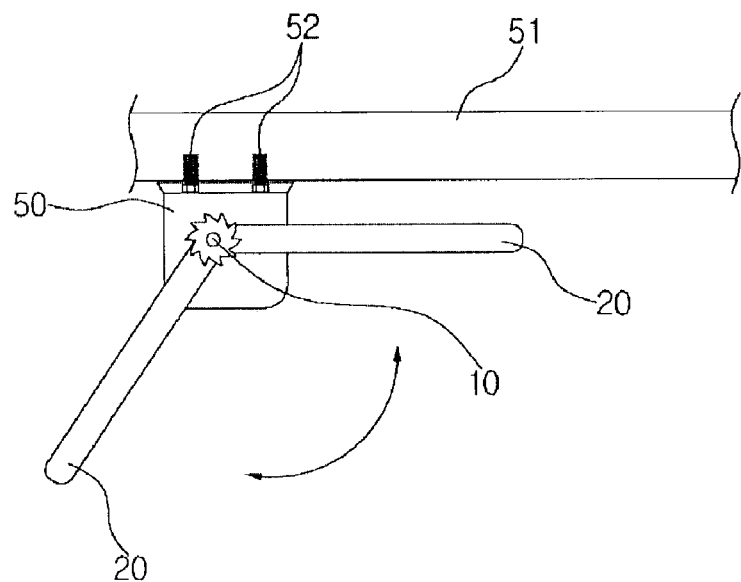
FIG. 8 shows the operation of the sun visor according to the present invention.

FIG. 8 shows an example of the sun visor coupling part 50 connected to the frame 20 that is rotated around the ceiling-connected part 10.

In this case, the sun visor coupling part 50 is fixed on the ceiling 51 of the car. The fixing is carried out by means of a fastening bolt 52.

Figure 9:
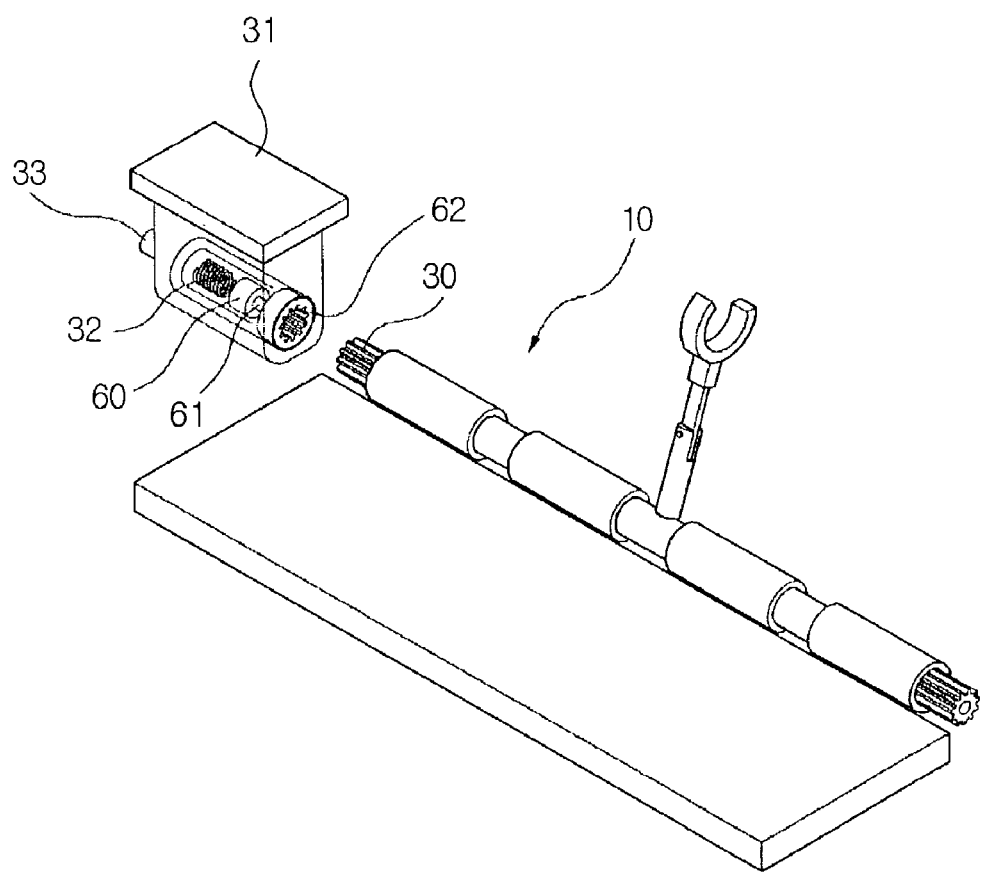
FIG. 9 shows an embodiment for operation of the ceiling-connected part according to the present invention.

FIG. 9 shows the attachment and detachment of the ceiling-connected part 10 and the operation thereof.

An explanation of the structure of the sun visor coupling part 50, as well known in this field, is avoided, but an explanation of the parts connected to a connecting shaft 30 will be described hereinafter.

The connecting shaft 30 is inserted by the use of elasticity. To do this, the sun visor coupling part 50 is provided with a fixed part 31 that has a spring 32 therein. If the connecting shaft 30 pushes into the fixed part 31, it can be easily fitted into the fixed part 31 by the compression of the spring 32. The structure is provided on the both ends of the connecting shaft 30 or any one end.

The spring 32 is connected to a servomotor 60, a motor shaft 61 and a gear body 62 on the front side. The gear body 62 is formed with a gear tooth in the inner diameter such that it can engage with the gear on the connecting shaft 30. Thus, if the servomotor 60 rotates, the rotating force is delivered to the motor shaft 62, which causes the gear body 62 to rotate. As a result, the connection shaft 30 rotates such that the frame 20 can be turned.

If a button 33 protruded on the fixed part 31 is depressed, for example, the servomotor 60 operates to rotate the gear body 60, and the connecting shaft 30 that engages with the gear body 60 rotates such that the frame 20 can be folded at a predetermined angle. After that, if the button 33 is depressed once again, the frame 20 can rotate only by a predetermined angle by the operation of a limit switch.

The position of the button 33 doesn't matter. Even if the button 33 is disposed on the side in the drawing, it may be disposed on the front side, which is more convenient in the manipulation. This embodiment as shown in FIG. 9 can be applied when the car is manufactured.

Figure 10:
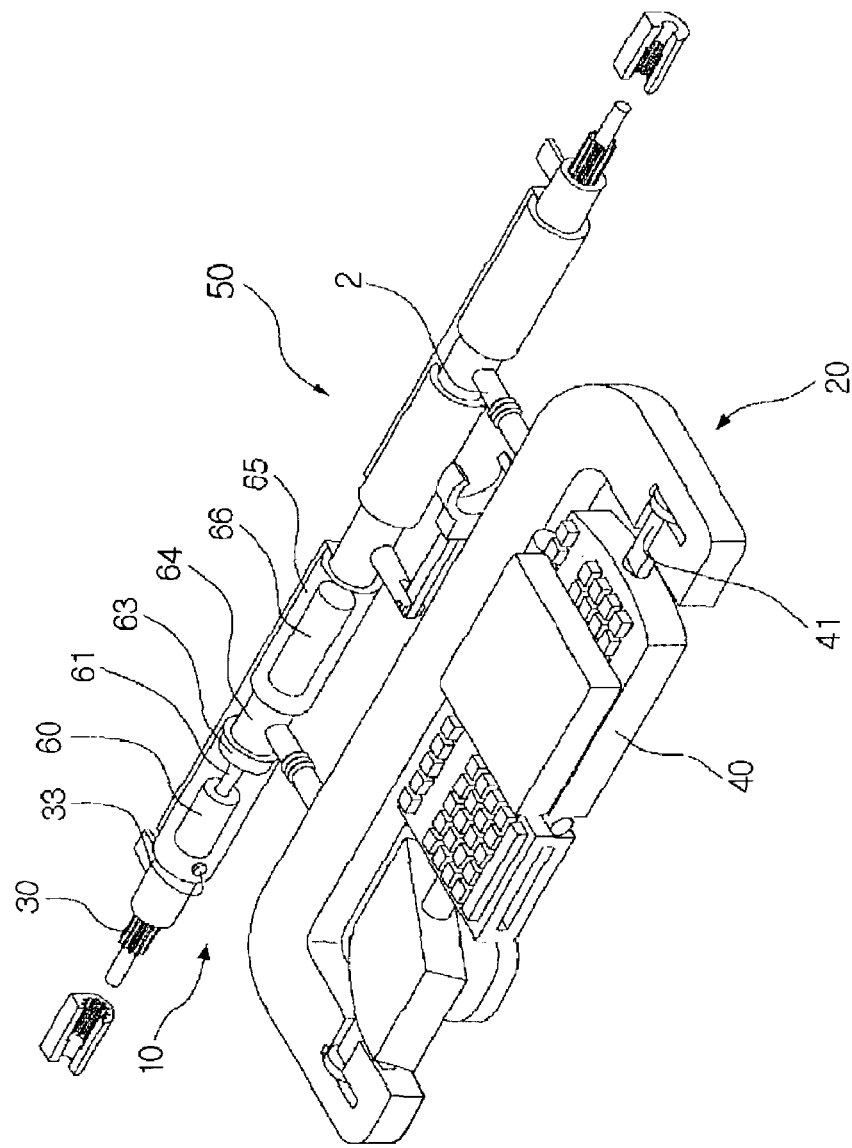
FIG. 10 shows another embodiment for operation of the ceiling-connected part in FIG. 9.

The part connected to the connecting shaft 30, that is, the outer periphery of the gear body 62 is made of the elastic part 24 as shown in FIG. 6 for the purpose of elastically absorbing the impacts applied from the outside. In the same manner as above, the structure where the impacts are absorbed by elasticity can be applied on the part that engages with the connecting shaft 30 as will be described in FIG. 10. As shown in FIG. 10, the structure can be applied on a connecting rod 2. For example, the structure is replaced with another elastic body structure with a spring therein or with Zabara. Of course, any structure capable of elastically absorbing the impacts may be applied. With the structure, the vibration or impact applied on the connecting rod 2, the shaft 41 and the connecting shaft 30 can be absorbed such that the equipment can be used in a more stable manner.

FIG. 10 shows another embodiment for operation of the ceiling-connected part 10 in FIG. 9.

In this case, the ceiling-connected part 10 is provided with a servomotor therein such that it can rotate by itself.

As shown, the ceiling-connected part 10 is provided with the servomotor 60, the motor shaft 61 and a coupling 63 connected to the servomotor 60 and the motor shaft 61 in the predetermined interior. The coupling 63 is adapted to engage with a rotary shaft 64 such that it can rotate together with the rotary shaft 64. This can be driven by the power of a battery 66 within a battery box 65.

In addition, the ceiling-connected part 10 is provided with an operation button 33 that enables the operation of the servomotor 60, on the one side of the front portion. If the operation button 33 is depressed, the ceiling-connected part 10 rotates by a predetermined number of rotations by the operation of the servomotor 60 such that the frame 20 can rotate by a predetermined angle, and contrarily, if it is depressed once again, the ceiling-connected part 10 is returned to its original position.

With one set of product having such the structure as shown in FIG. 10, the embodiment of the present invention can be applied in the existing cars. Of course, the structure can be applied when the car is manufactured.

The control part, i.e., the control circuit (which is not shown), for driving the servomotor as shown in FIGS. 9 and 10, can be disposed adjacent to the servomotor or in any position. This control part is well known to those skilled in the art, and an explanation of it will be excluded in this detailed description for the sake of brevity.

The sun visor according to the present invention is separated from the coupled state in FIGS. 9 and 10 and can be of course used, as shown in FIG. 2.

Figure 11:
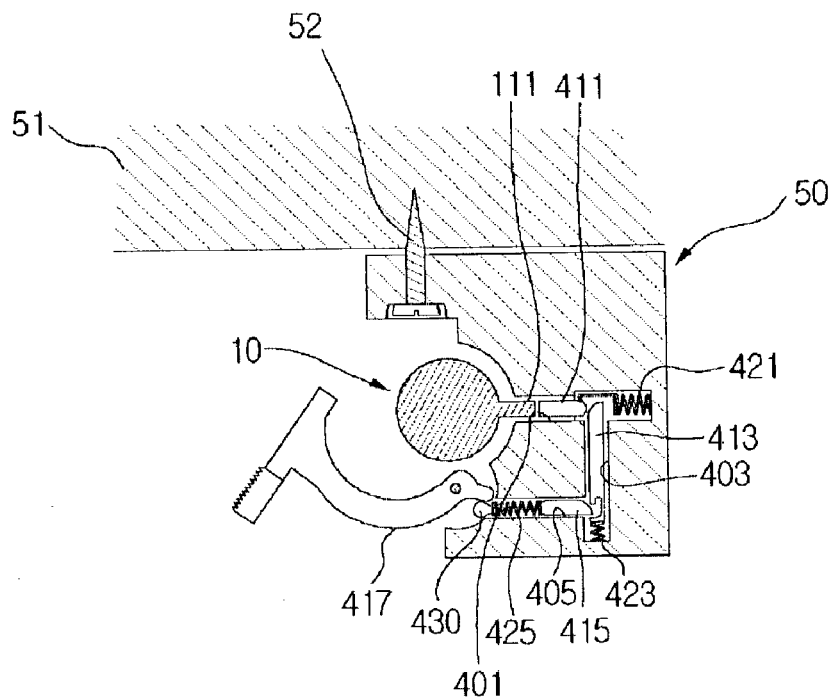
FIG. 11 shows another embodiment for the sun visor coupling part according to the present invention.
Figure 12:
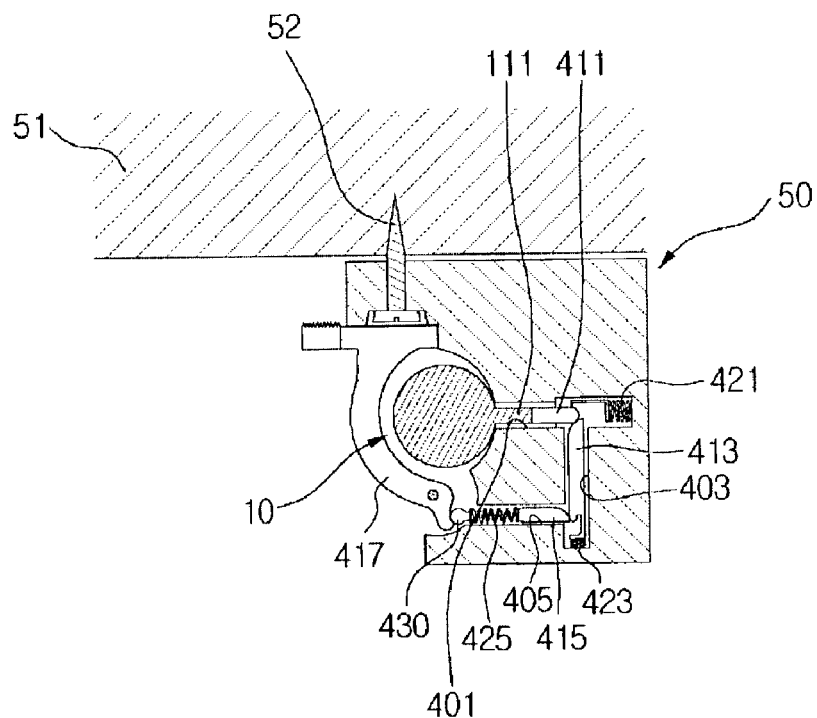
FIG. 12 shows still another embodiment for the sun visor coupling part according to the present invention.
Figure 13:
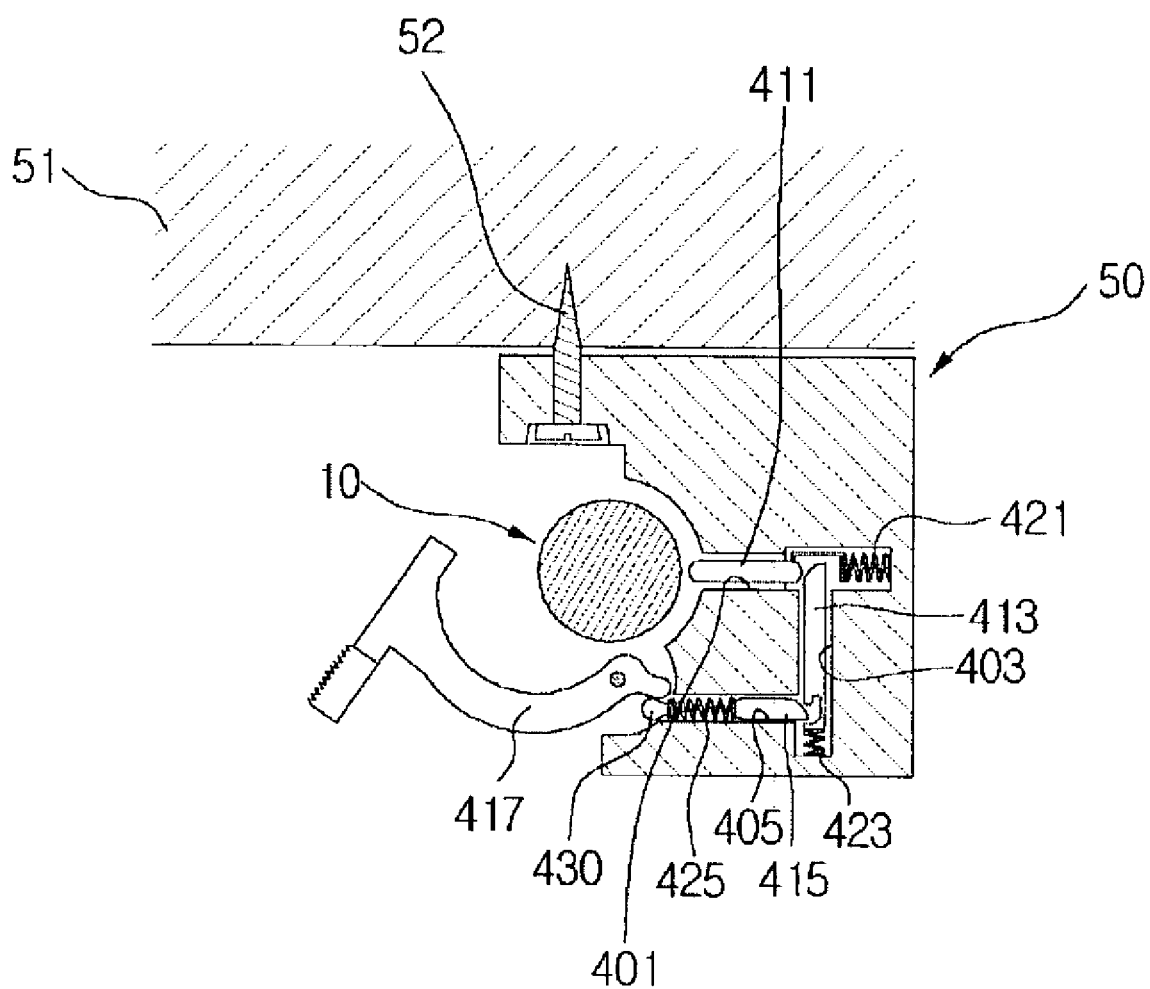
FIG. 13 shows yet another embodiment for the sun visor coupling part according to the present invention.
Figure 14:
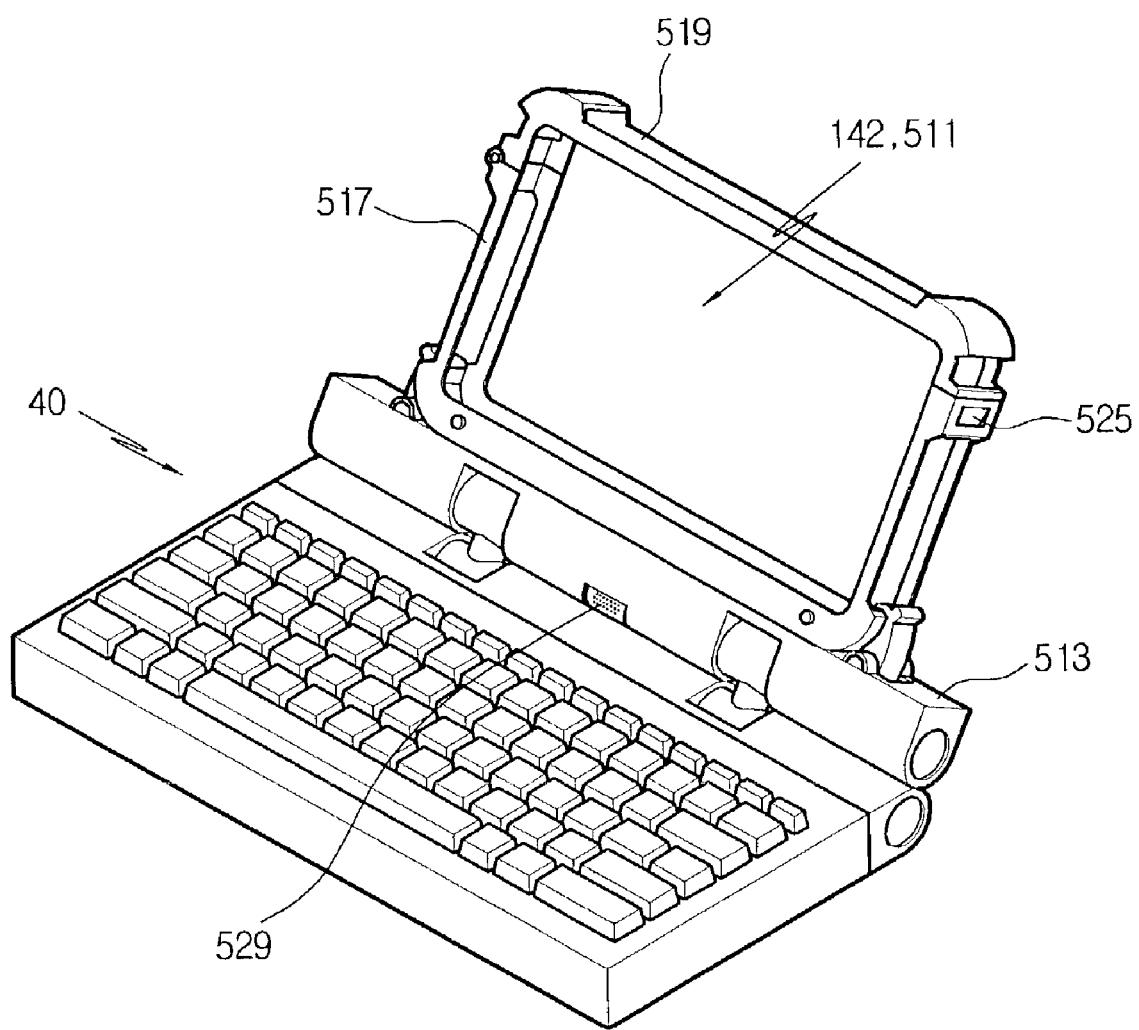
FIG. 14 shows a perspective view for the office equipment used in the sun visor according to the present invention.
Figure 15:
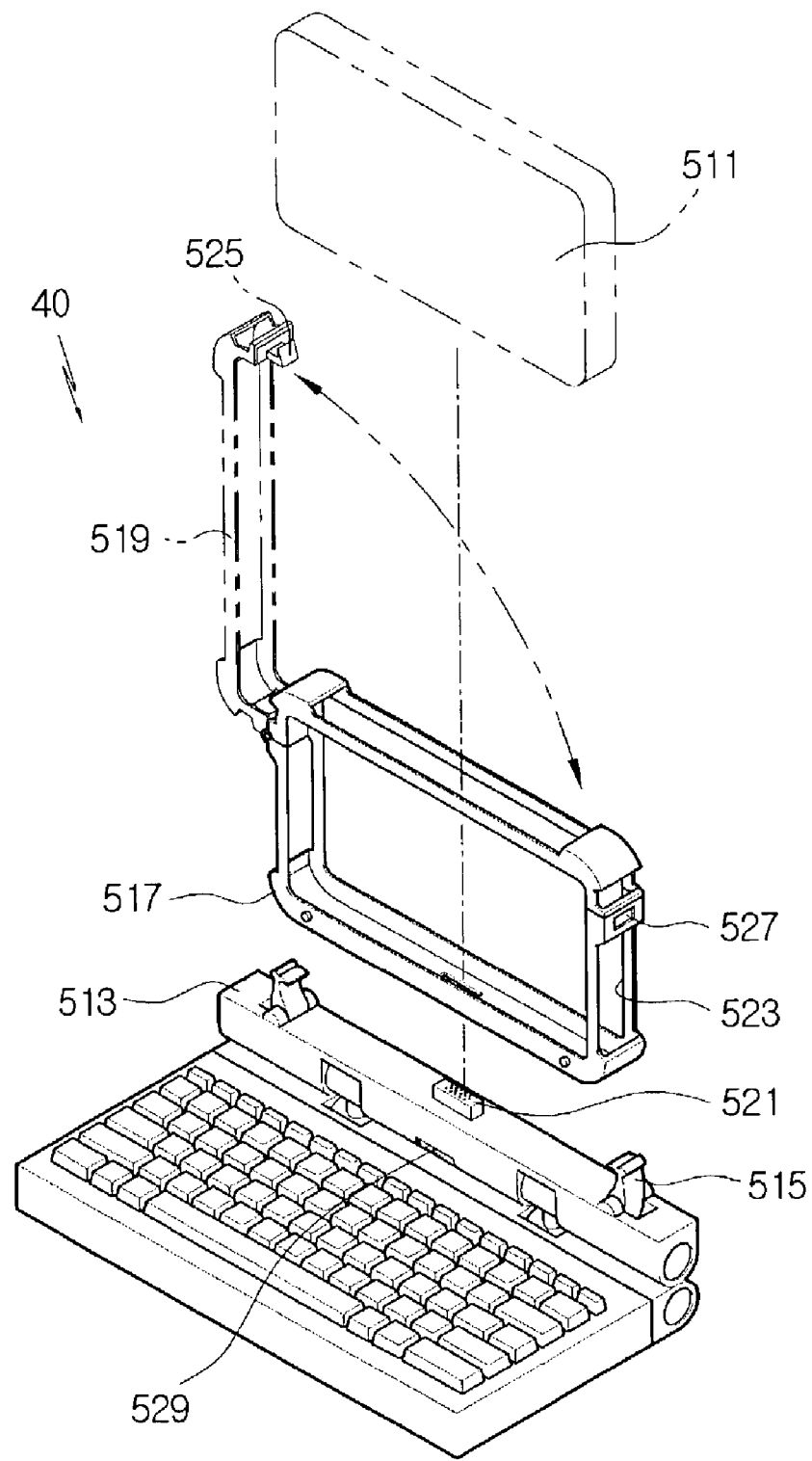
FIG. 15 shows an exploded view for the office equipment used in the sun visor according to the present invention.
Figure 16:
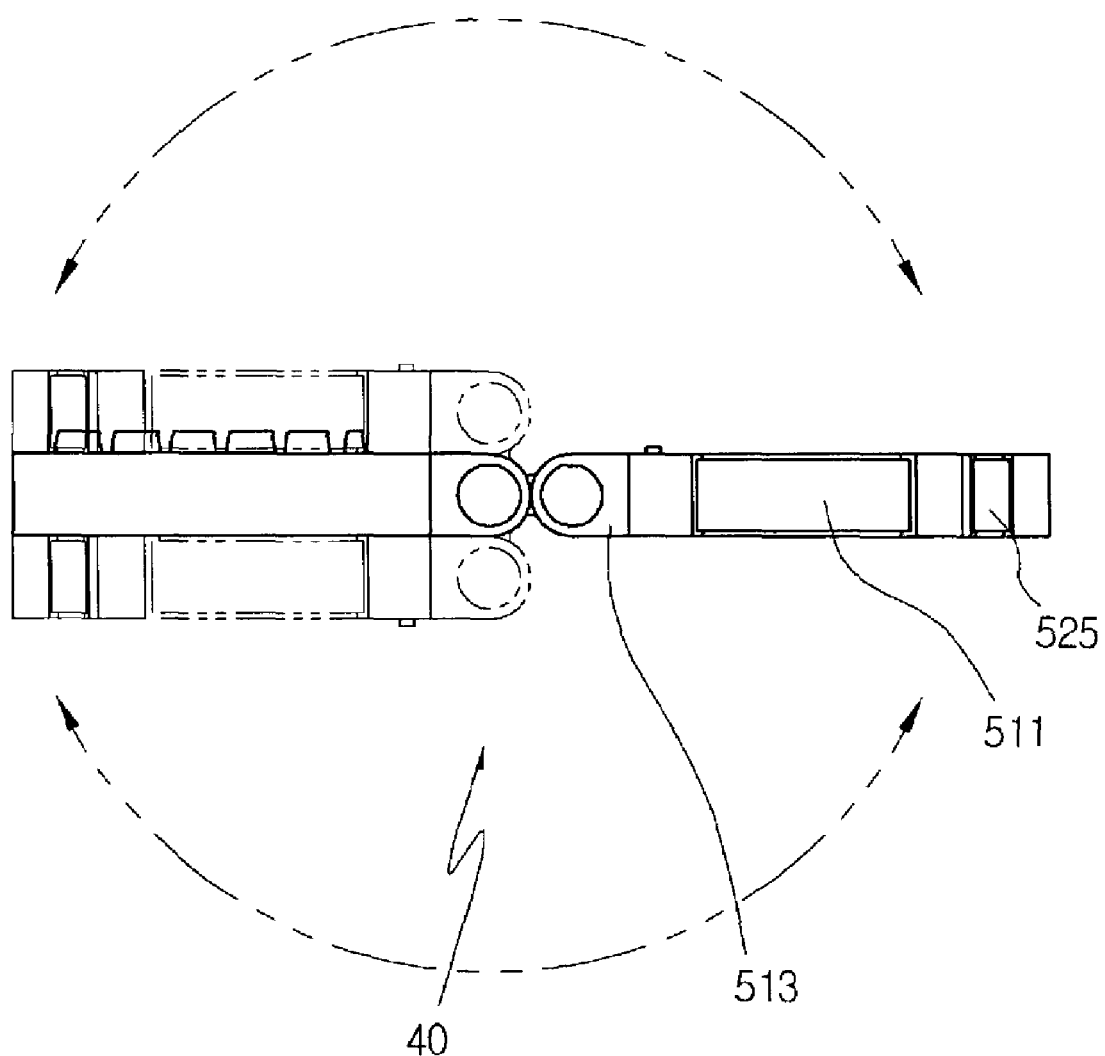
FIG. 16 shows a schematic view for the rotating state of the office equipment used in the sun visor according to the present invention.
Figure 17:
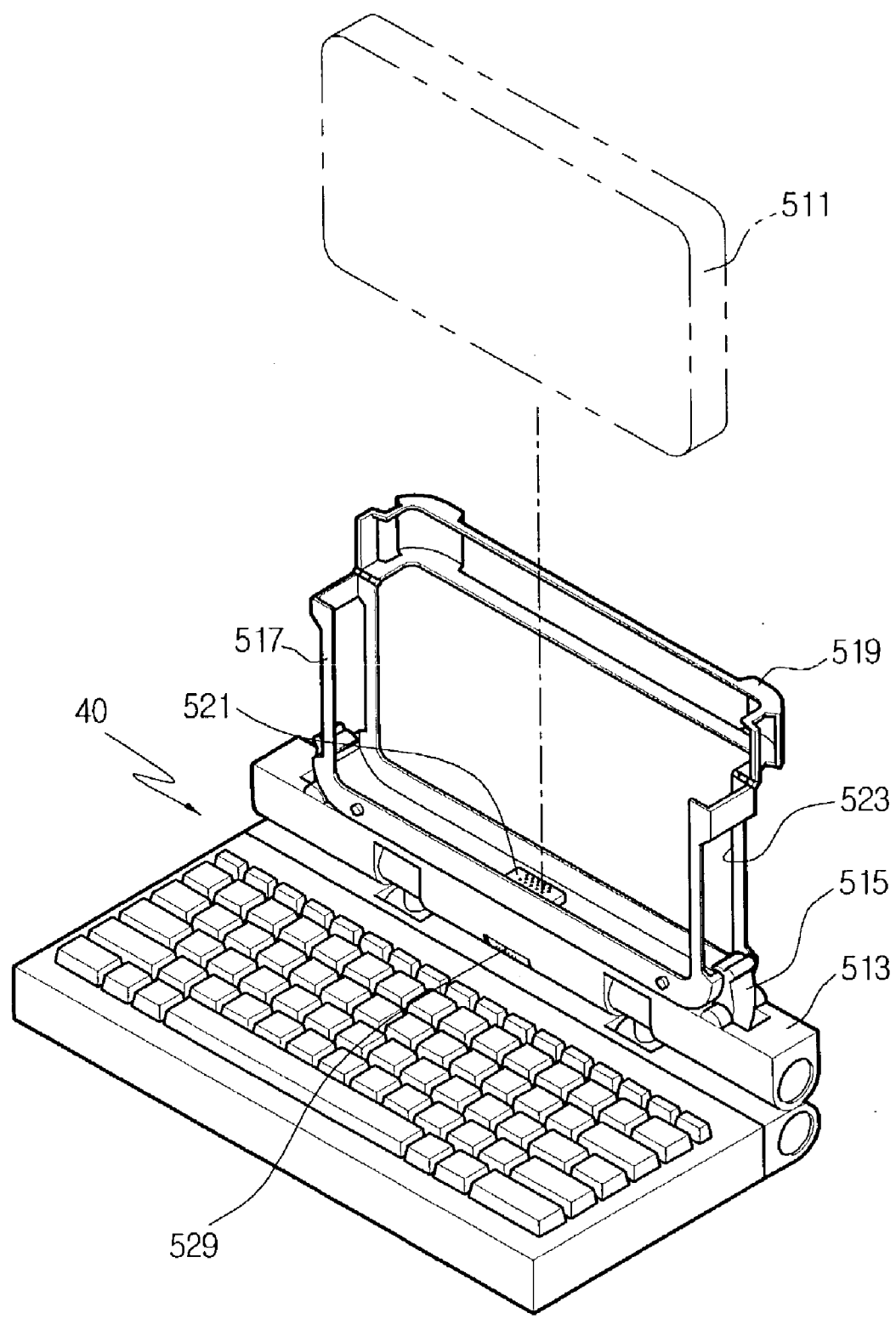
FIG. 17 shows an exploded view for another structure of the office equipment used in the sun visor according to the present invention.

On the other hand, FIGS. 11 to 13 show another embodiment for operation of the ceiling-connected part 10 in FIG. 9. In the state where the sun visor coupling part 50 is coupled through the fastening bolt 52 on the ceiling 51, it is adapted to enable the ceiling-connected part 10 to be mounted and dismounted in an easy way. The sun visor coupling part 50 includes a first moving body 411 disposed in a first guide hole 401 for moving forward and backward with a first spring 421 in accordance with the pressure set of the ceiling-connected part 10, a second moving body 413 disposed in a second guide hole 403 for moving upward and downward with a second spring 423 in accordance with the pushing pressure of the first moving body 411, a third moving body 415 disposed in a third spring 425 for moving forward and backward with a third spring 425 in accordance with the ascending and descending movement of the second moving body 413, and a cam 430 for transmitting pressure to a rotary door 417 rotating around the hinge shaft in accordance with the pressure of the third spring 425 of the third moving body 415.

The first moving body 411 is protruded to the inside or outside of the first guide hole 401 in the state of being disposed in the first guide hole 401. If the first moving body 411 is protruded to the inside of the first guide hole 401, the ceiling-connected part 10 is provided with the fixed protrusion 111, and contrarily, if the first moving body 411 is protruded to the outside of the first guide hole 401, the installation of the fixed protrusion 111 is not required, as shown in FIG. 13.

As noted above, if the ceiling-connected part 10 is coupled with the sun visor coupling part 50 and at the same time, if a predetermined pressure is applied to the ceiling-connected part 10, the first moving body 411 of the sun visor coupling part 50 moves in the backward direction, such that the second moving body 413 moves in the downward direction. At the same time, the third moving body 415 moves in the forward direction. The movement of the third moving body 415 in the forward direction makes the third spring 425 compressed such that the compression caused by the third spring 425 enables the end part of the rotary door 417 supported by the hinge shaft to be held by the cam 430, thereby maintaining the opened state of the rotary door 417. After that, if the rotary door 417 is closed, the upper side of the end part of the rotary door 417 is supported by the cam 430 to thereby press the cam 430, thereby maintaining the closed state of the rotary door 417. If the ceiling-connected part 10 is separated from the sun visor coupling part 50, the rotary door 417 is opened and the ceiling-connected part 10 is then separated therefrom. When the rotary door 417 is opened, the lower side of the end part of the rotary door 417 gets in close contact with the cam 430.

If the ceiling-connected part 10 is separated from the sun visor coupling part 50, the first to third moving bodies 411 to 415 are returned to their original positions by the restoring forces of the respective springs 421 to 425.

On the other hand, FIGS. 14 to 17 show the office equipment 40 that is provided with the display part 142 to and from which a portable computer (PDA) 511 is attached and detached. The office equipment 40 includes locking bodies 515 that are disposed toward the center on the both sides of a rotary member 513, which rotates by 180° by the application of an external force, a guide frame 517 that is adapted to be locked to the locking bodies 515 and to mount the portable computer 511 into the inside thereof, a support body 519 that is hinge-coupled to the guide frame 517 such that the portable computer 511 mounted in the guide frame 517 is not deviated to the outside of the guide frame 517, and a terminal part 521 that is disposed on the rotary member 513 for electrically connecting to the portable computer 511 and the office equipment 40 for the bi-directional communication therebetween.

The guide frame 517 forms an opened part 523 on the sides thereof, respectively and a locking groove 527 into which a locking protrusion 525 of the support body 519 is locked, on the one side thereof.

On the other hand, the terminal part 521 of the rotary member 513 is provided with a charging terminal 529 for electrically charging the office equipment 40, on the one side thereof.

Under the above-mentioned state, the guide frame 517 is disposed on the top side of the rotary member 513 and is fixed by means of the locking bodies 515. Then, the portable computer 511 is inserted into the guide frame 517 and at the same time, the support body 519 rotates such that the locking protrusion 511 is locked to the locking groove 527. In this state, the portable computer 511 is not deviated from the guide frame 517 and in order for the user's view to correspond with the position of the portable computer 511 set, the guide frame 517 or the rotary member 513 rotates at an appropriate angle. Also, in order to manipulate the portable computer 511 during the operation thereof, manipulating buttons that are not shown in the drawings are pressed through the opened parts 523 on the guide frame 517.

Figure 18:
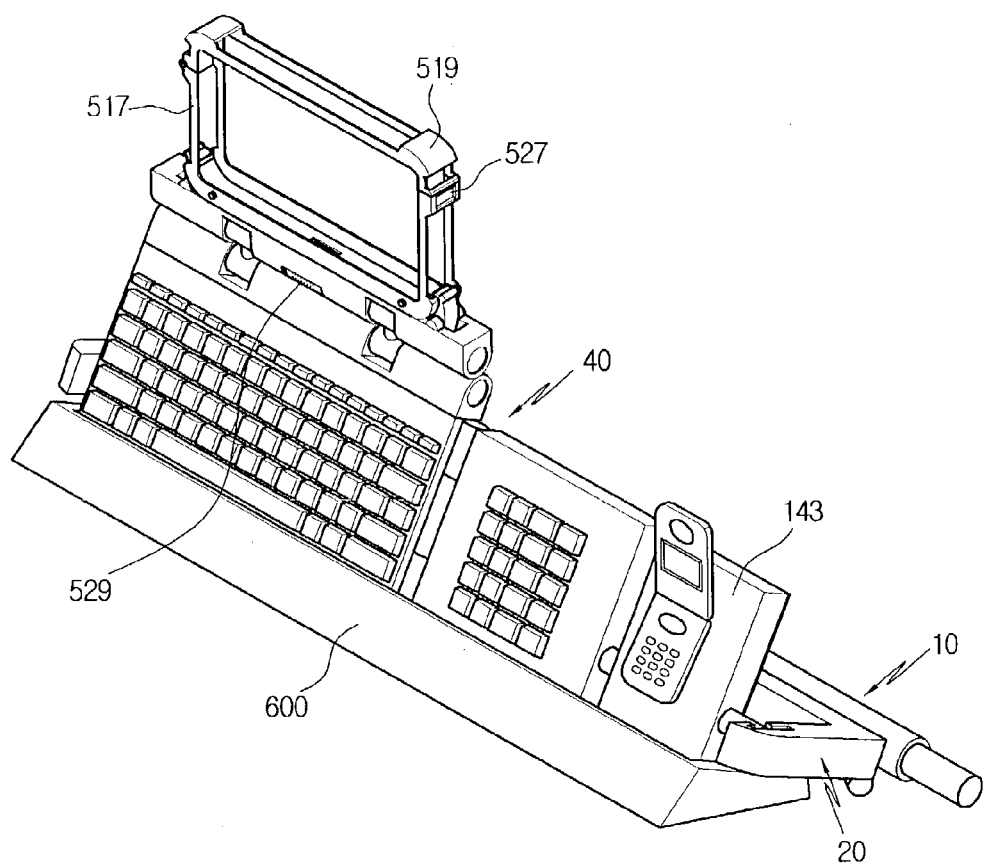
FIG. 18 shows a perspective view for the coupled state of the office equipment with a mounting stand used in the sun visor according to the present invention.
Figure 19:
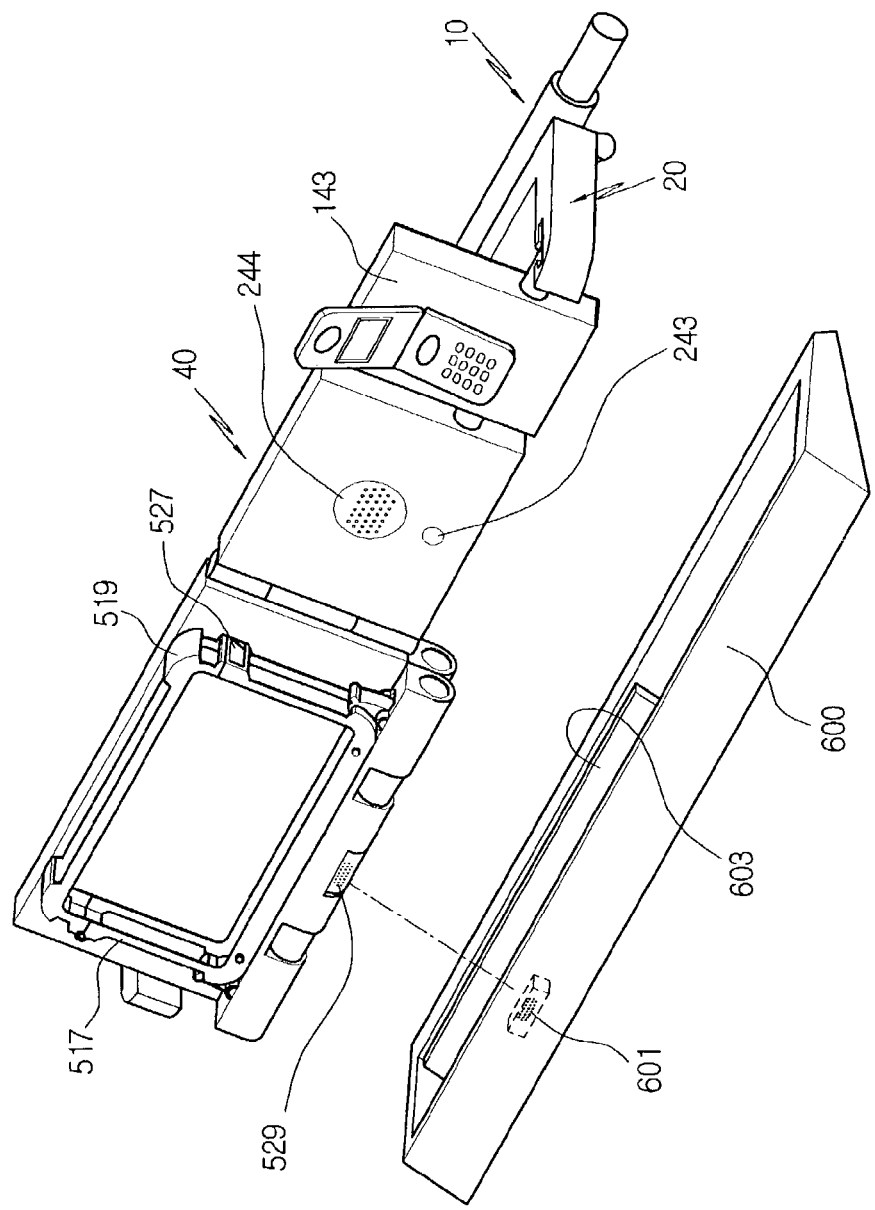
FIG. 19 shows a perspective view for the separated state of the office equipment from the mounting stand used in the sun visor according to the present invention.
Figure 20:
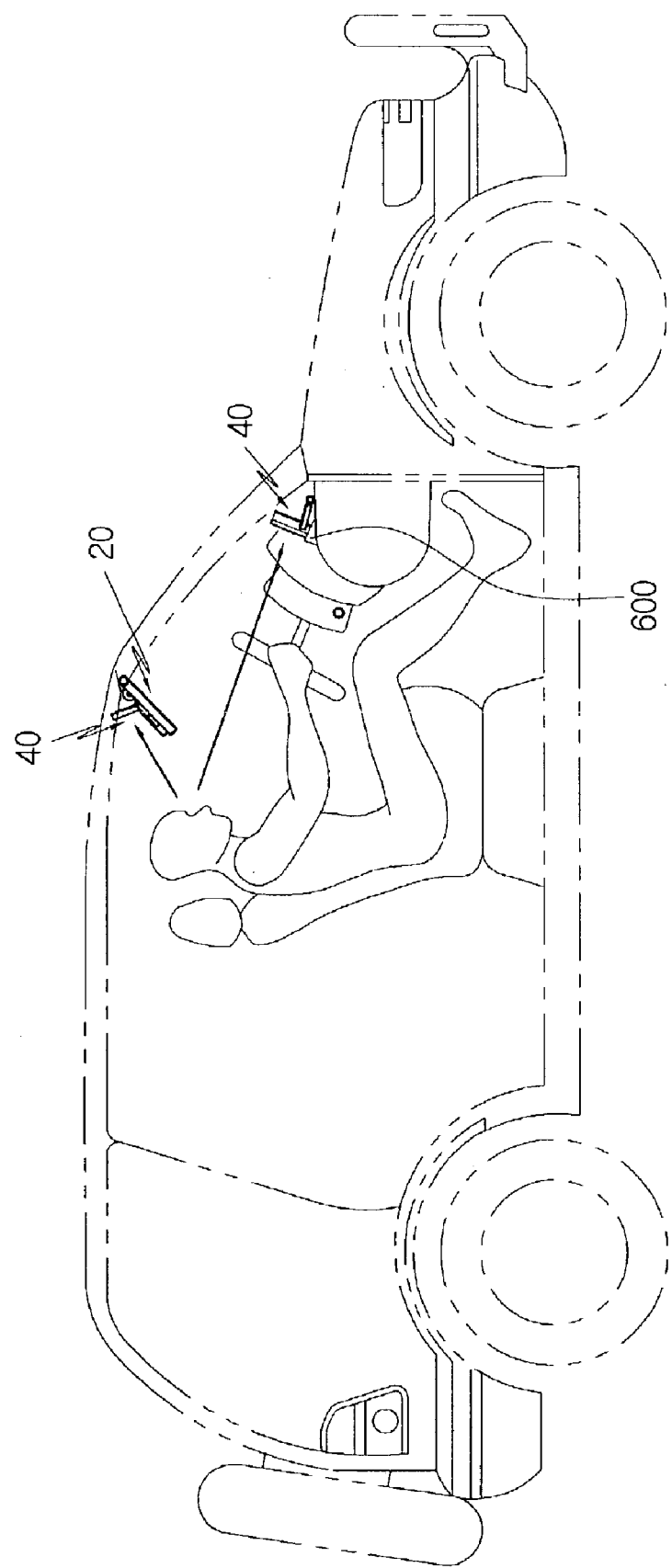
FIG. 20 shows a view for the office equipment in use in the sun visor according to the present invention.

FIGS. 18 to 20 show the office equipment 40 and a mounting stand 600. The mounting stand 600 is fixedly disposed on the front panel of the car, on which the office equipment 40 is placed (in this case, the frame 20 is disposed on the ceiling-connected part 10 in such a manner as to rotate around the ceiling-connected part 10). When the office equipment 40 is not in use, the mounting stand 600 charges the office equipment 40 by virtue of charging terminals 601 and 529. The mounting stand 600 forms a compressing and coupling member 603 that is movable on the inside of the center thereof for elastically supporting the office equipment 40 in accordance with the variation of the thickness of the office equipment 40. The office equipment 40 forms the mike 243 and the speaker 244 on the rear portion thereof, for the hands-free function for a cellular phone.

Figure 21:
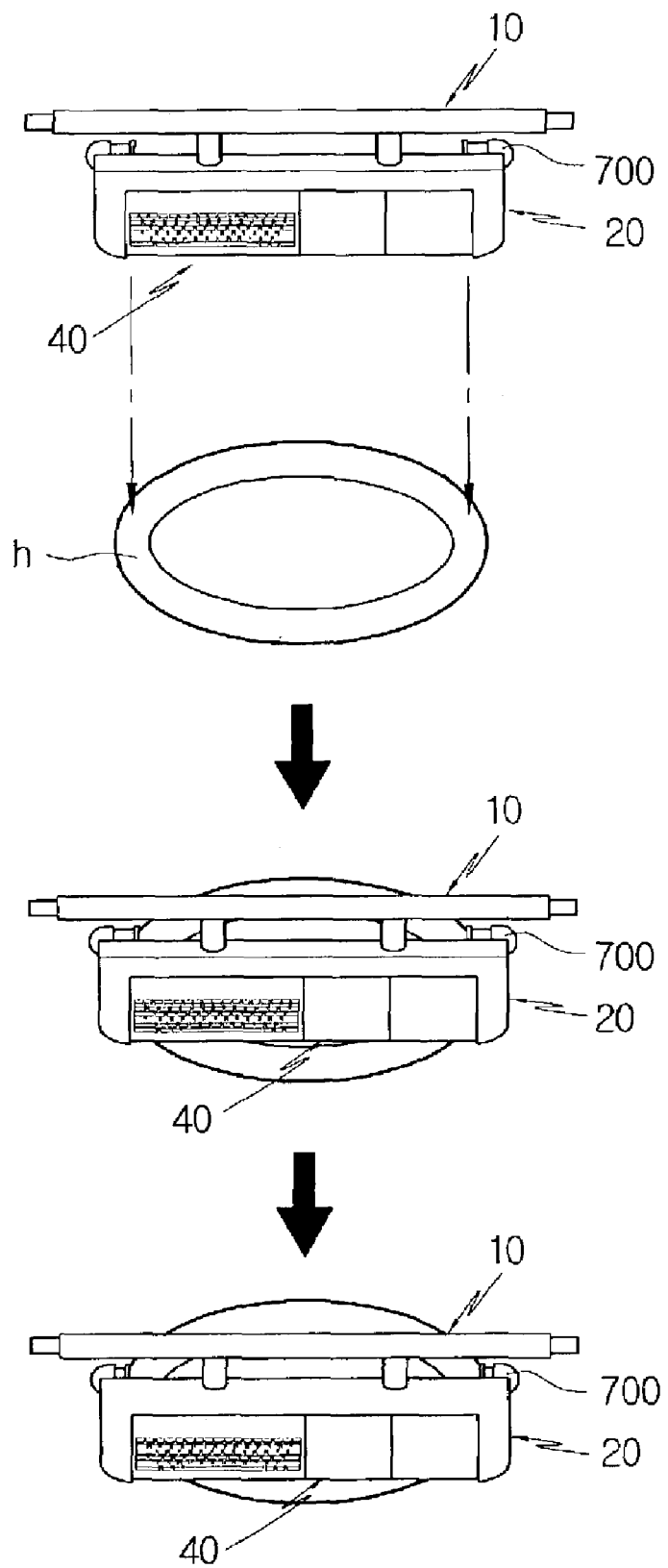
FIG. 21 shows a view for the frame mounted in the sun visor according to the present invention.
Figure 22:
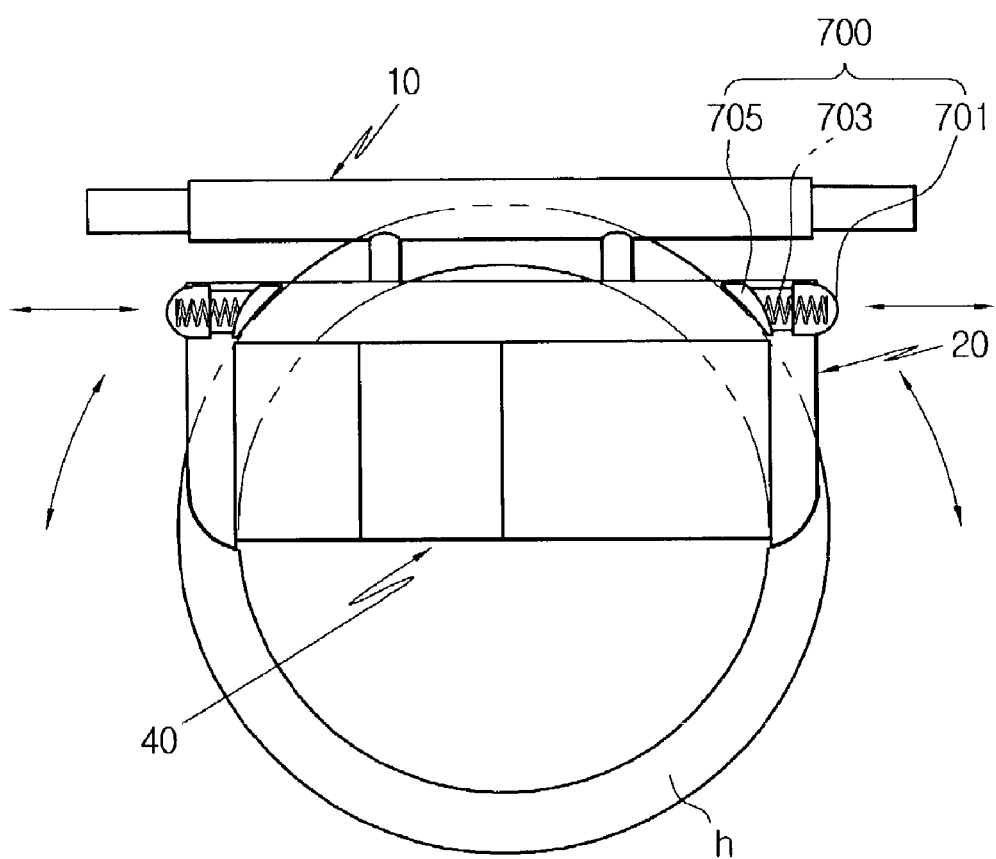
FIG. 22 shows a bottom view for the frame mounted in the sun visor according to the present invention.

FIGS. 21 and 22 show the frame 20 mounted in the sun visor according to the present invention. While the frame 20 is fixed on the steering wheel h by using the insertion bar 130 as shown in FIG. 2, it is fixed on the steering wheel h by using a compressing and supporting part 700 as shown in FIGS. 21 and 22. The compressing and supporting part 700 includes a guide groove 701 that is formed on a predetermined portion of the frame 20, a spring 703 that is disposed on the guide groove 701 to generate pressure to the outside, and a support body 705 that is formed on the front end of the spring 703 and comes in contact with the curved face of the steering wheel h. The support body 705 is formed along the curved face of the steering wheel h such that the frame 20 is stably fixed on the steering wheel h. In case of separating the steering wheel h from the frame 20, the support body 705 pulls to the outside of the steering wheel h, and also the frame 20 is disposed in the upward direction thereof.

Figure 23:
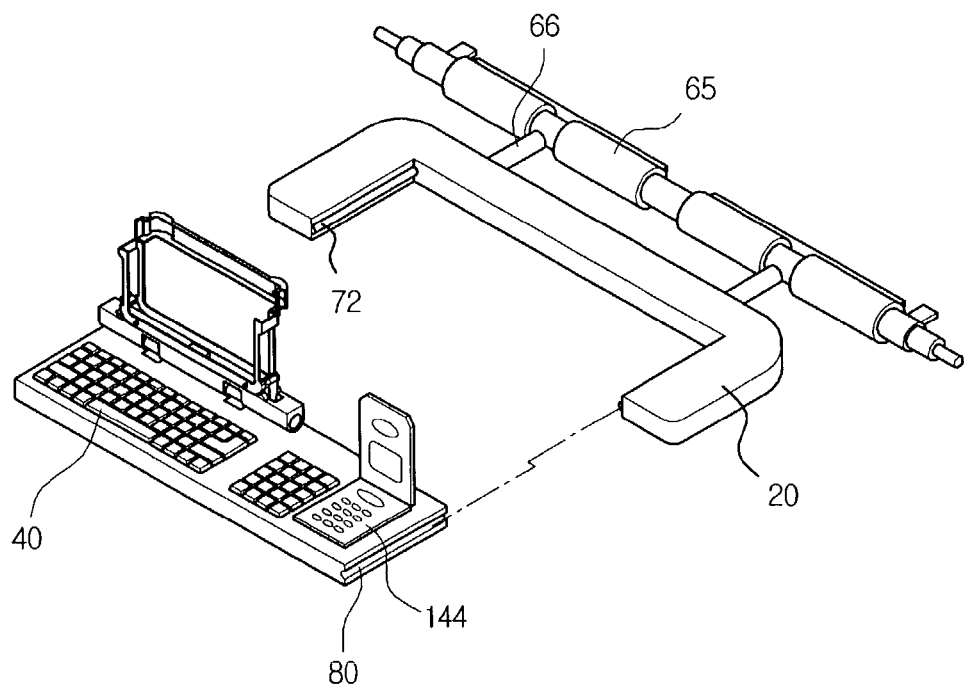
FIG. 23 shows still another embodiment of the present invention.
Figure 24:
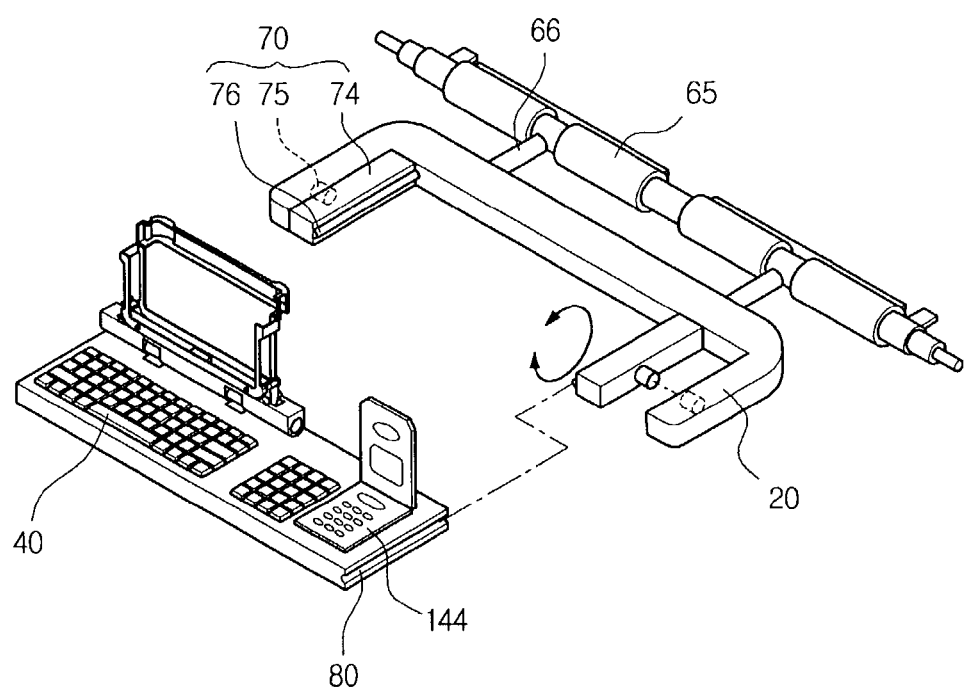
FIG. 24 shows still another embodiment of the present invention.

In accordance with another embodiment of the present invention, the frame body 20 includes holding members 70 at both sides thereof and the office equipment 40 includes guiding grooves 80 which engages with the holding members 70, as shown in FIGS. 23 to 27, respectively. The holding members 70 may be formed as guide rails 72 provided on inner surfaces of both sides of the frame body 20, as shown in FIG. 23. Alternatively, the holding members 70 may be formed as separated members each of which has a guide rail 76 and is rotatably engaged with the frame body 20, as shown in FIG. 24.

In FIG. 23, the office equipment 40 is slidably engaged with the holding members 70, i.e., the guide rails 72, of the frame body by inserting the guide rails 72 into the guide grooves 80. Either the guide rails 72 or the guide grooves 80 is configured to offer increased friction forces at the end portion thereof, thereby preventing unintended separation of the office equipment 40 from the frame body 20.

In FIG. 24, each of the holding members 70 includes a pin which formed on one side thereof and is inserted into a hole provided on the inner surface of the frame body, and a guide rail 76 which formed on the opposite side and engages with the guide groove 80. The office equipment 20 engages with the frame body 20 in a similar manner as in the embodiment of FIG. 23. In such a configuration, the office equipment 40 and the holding members 70 can rotate with respect to the frame body 20.

In a modified embodiment, the guide rails 72 or 76 may formed on the office equipment 40 and the guide grooves 80 may be provided on the frame body 20.

Figure 25:
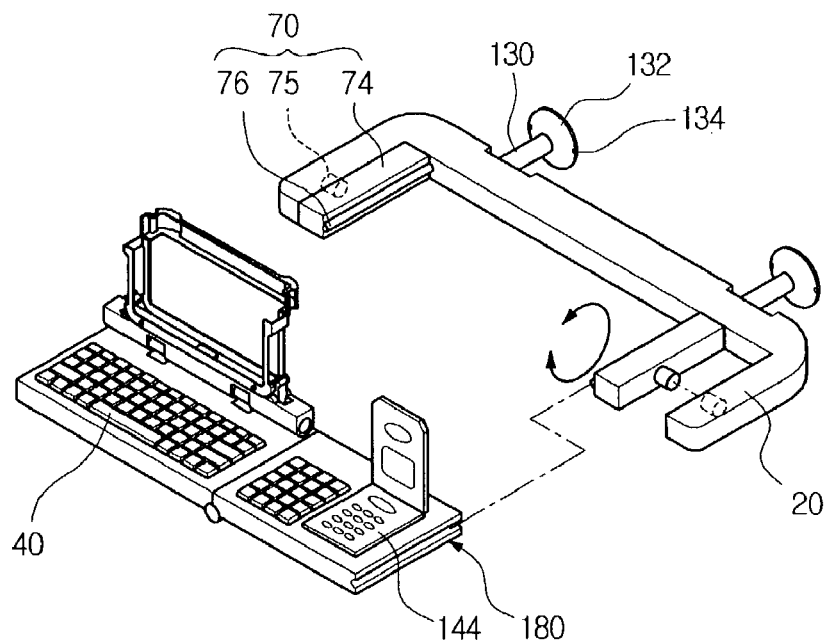
FIG. 25 shows still another embodiment of the present invention including a frame body having a modified configuration.

In accordance with another embodiment of the present invention, the frame body 20 may be undetachably fixed to the ceiling of a vehicle, as shown in FIG. 25. In such an embodiment, the frame body 20 includes shaft 130 whose end portion 132 is fixed to the ceiling of a vehicle by, for example, screws 134.

Figure 26:
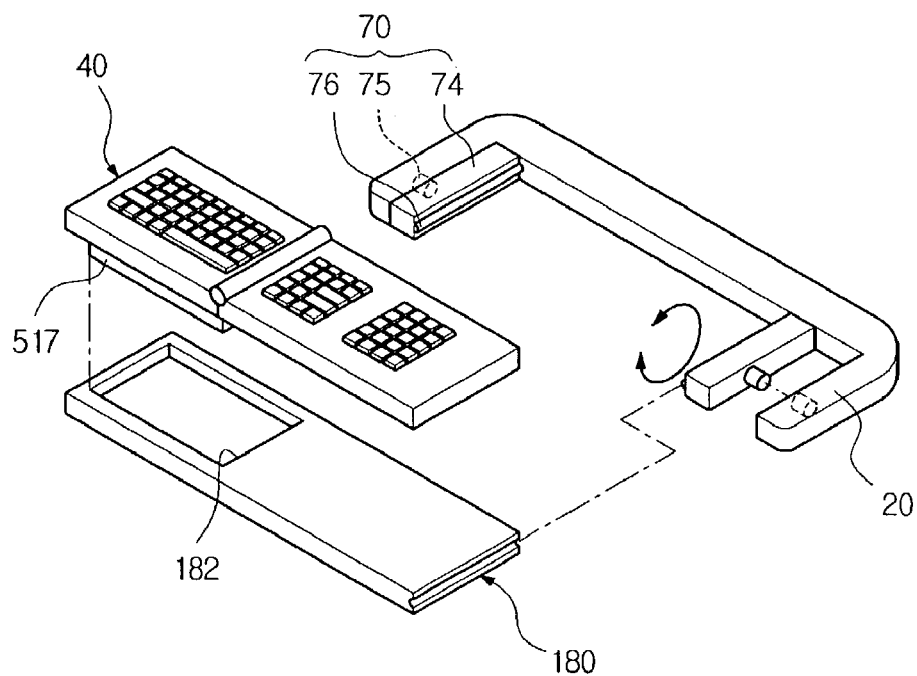
FIG. 26 shows still another embodiment of the present invention including a carrying member for mounting an office equipment.

In another embodiment of the present invention, a carrying member 180 for mounting the office equipment thereon can be provided, as shown in FIG. 26. The carrying member 180 may have an opening 182 into which the display 517 of the office equipment 40 is inserted.

Figure 27:
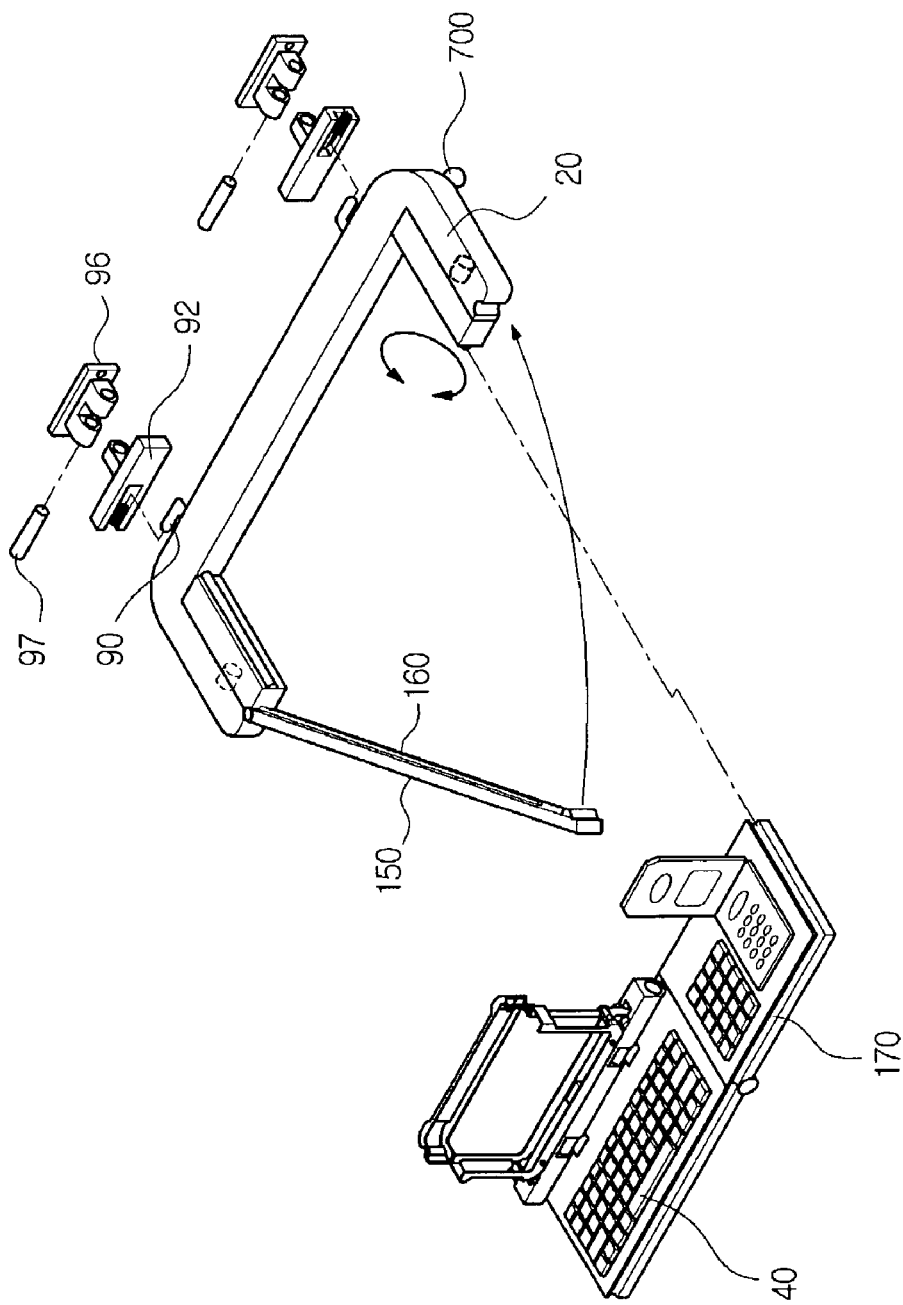
FIG. 27 shows still another embodiment of the present invention including a locking member for fixing an office equipment to the frame body.

As shown in FIG. 27, the frame body 20 may include a locking member 130. One end portion of the locking member 130 is hinged to the frame body 20 and the other end portion of the locking member 130 engages with the frame body 20. In such a configuration, unintended separation of the office equipment 40 from the frame body 20 can be prevented by closing the locking member 130. Further, the locking member 150 may include protruded portion 160 to support the office equipment 40. An insertion groove 170 may be provided on the side portion of the office equipment to receive the protruded portion 160.

Figure 28:
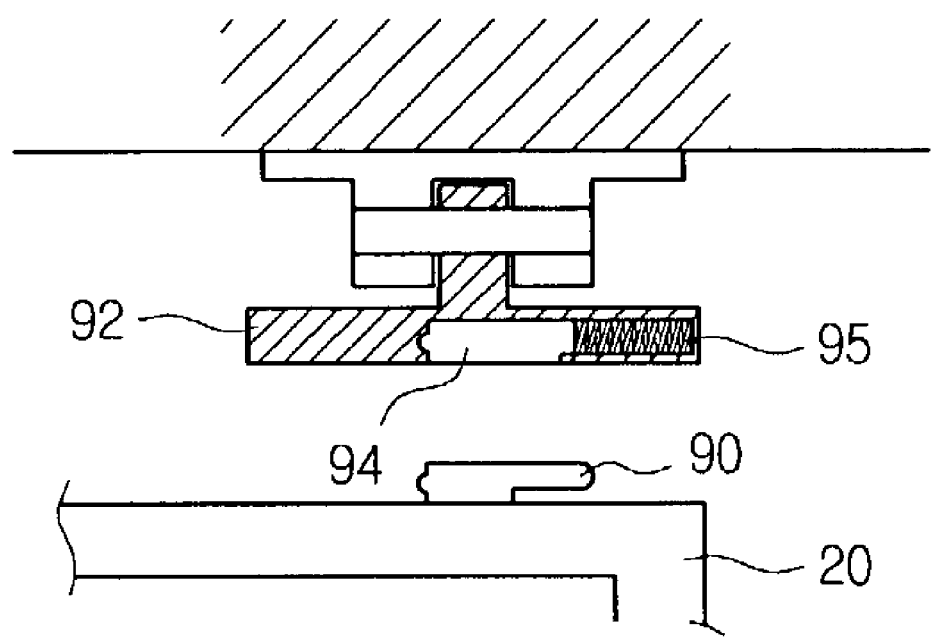
FIG. 28 shows a sectional view of engaging members of the embodiment depicted in FIG. 27.

In FIGS. 27 and 28, the frame body includes latch members 90. The latch members 90 engage with ceiling-connected part 96 via connecting members 92. Each of the connecting members 92 has a groove 94 into which the latch members 90 are inserted and a resilient member such as spring installed in the groove 95. The spring 95 pushes against the latch member 90 which is inserted into the groove 94. The ceiling-connected part 92 may be fixed to the ceiling of a vehicle by screws and the connecting member 92 is rotatably engaged with the ceiling-connected part 92 via a pin 97.

Figure 29:
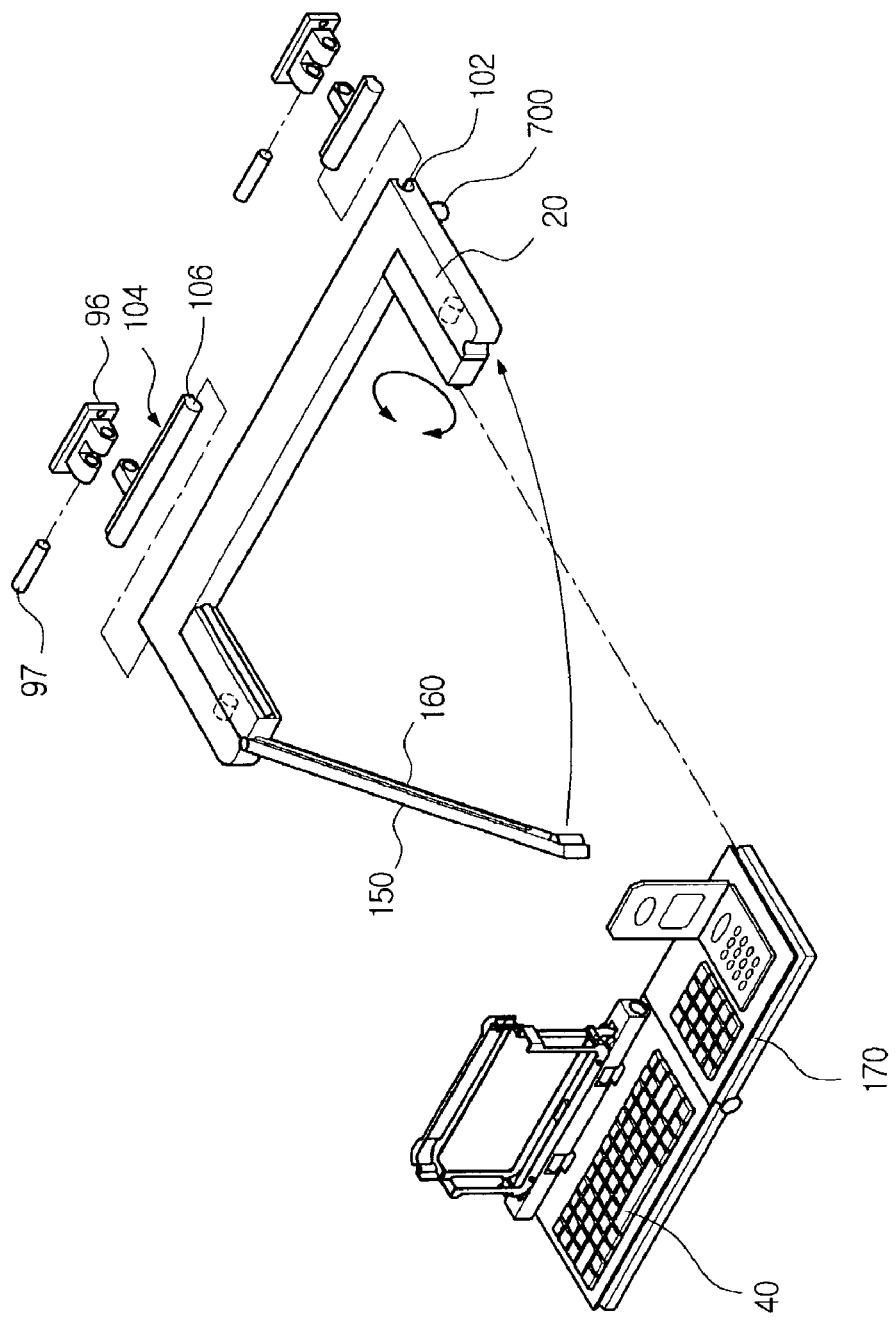
FIG. 29 shows still another embodiment of the present invention including an engaging members having a modified configuration.

In FIG. 29, the frame body includes sliding grooves 102 which formed in a longitudinal direction of the frame body 20. Connecting members 106 are slidably engaged with the sliding grooves 102. Preferably, at least two (2) connecting members are provided. The connecting member 102 is rotatably engaged with ceiling-connected parts 96 via a pin 97.

Figure 30:
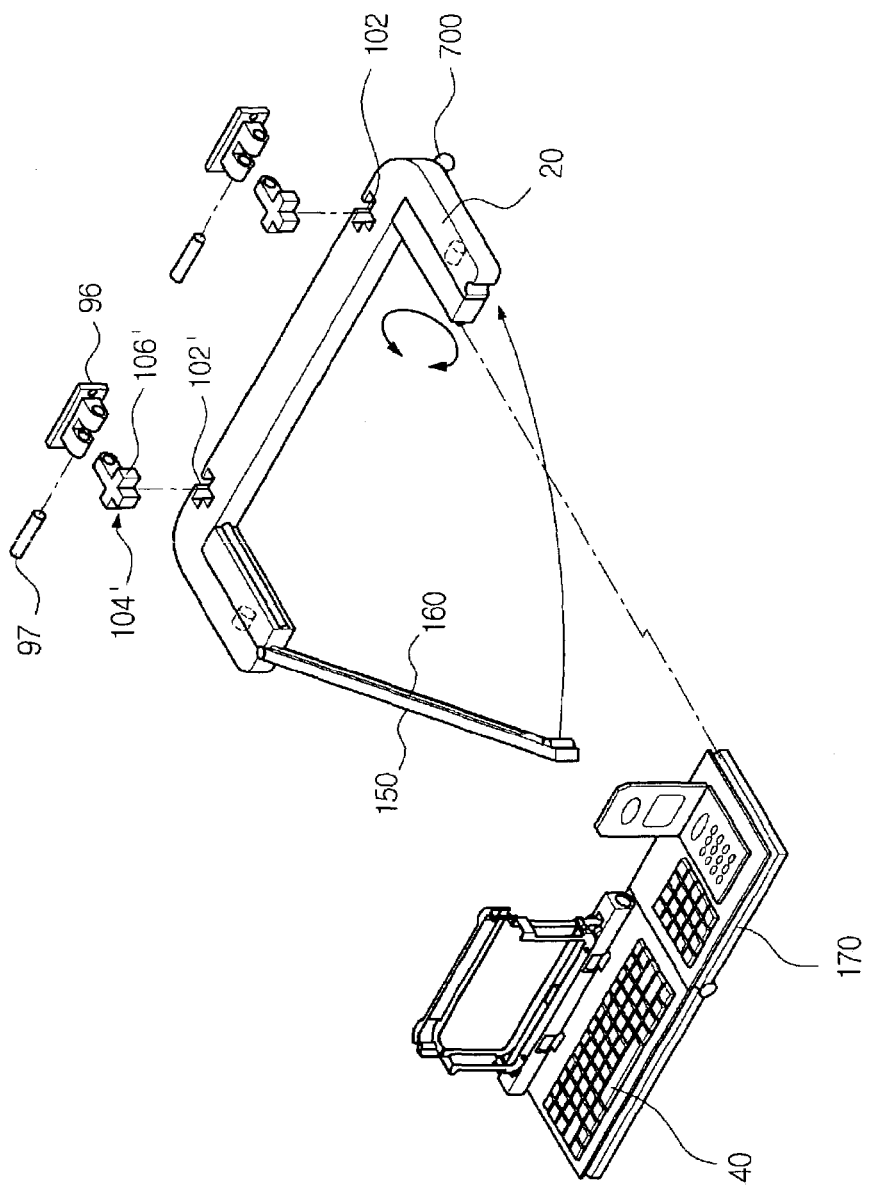
FIG. 30 shows still another embodiment of the present invention including an engaging members having a modified configuration.

In FIG. 30, there shows another type of connecting members 106' which slidable engaged with sliding grooves 102' formed in a traverse direction of the frame body 20. It is preferable that end portion of each connecting member 106' has a cross shape to secure firm engagement.

Figure 31:
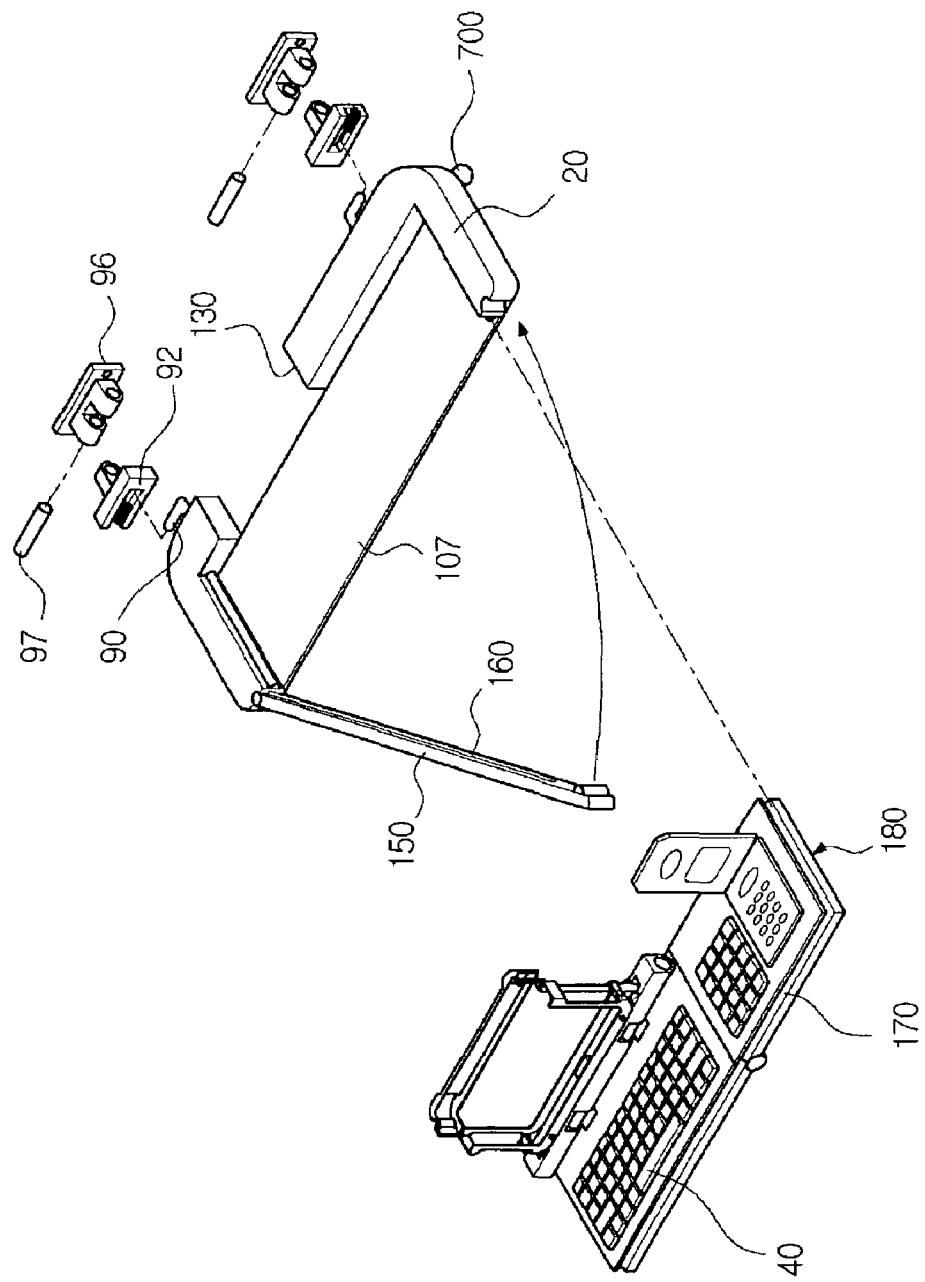
FIG. 31 shows still another embodiment of the present invention including an engaging members having a modified configuration.

In the embodiment shown in FIG. 31, the frame body 20 includes a base plate 107 for supporting the office equipment 20. The base plate 107 also prevents the office equipment 20 to be harmed by external forces. Further, a portion of the frame body 20 may be canceled so that the movement of the display does not interfere with the frame body 20.

Figure 32:
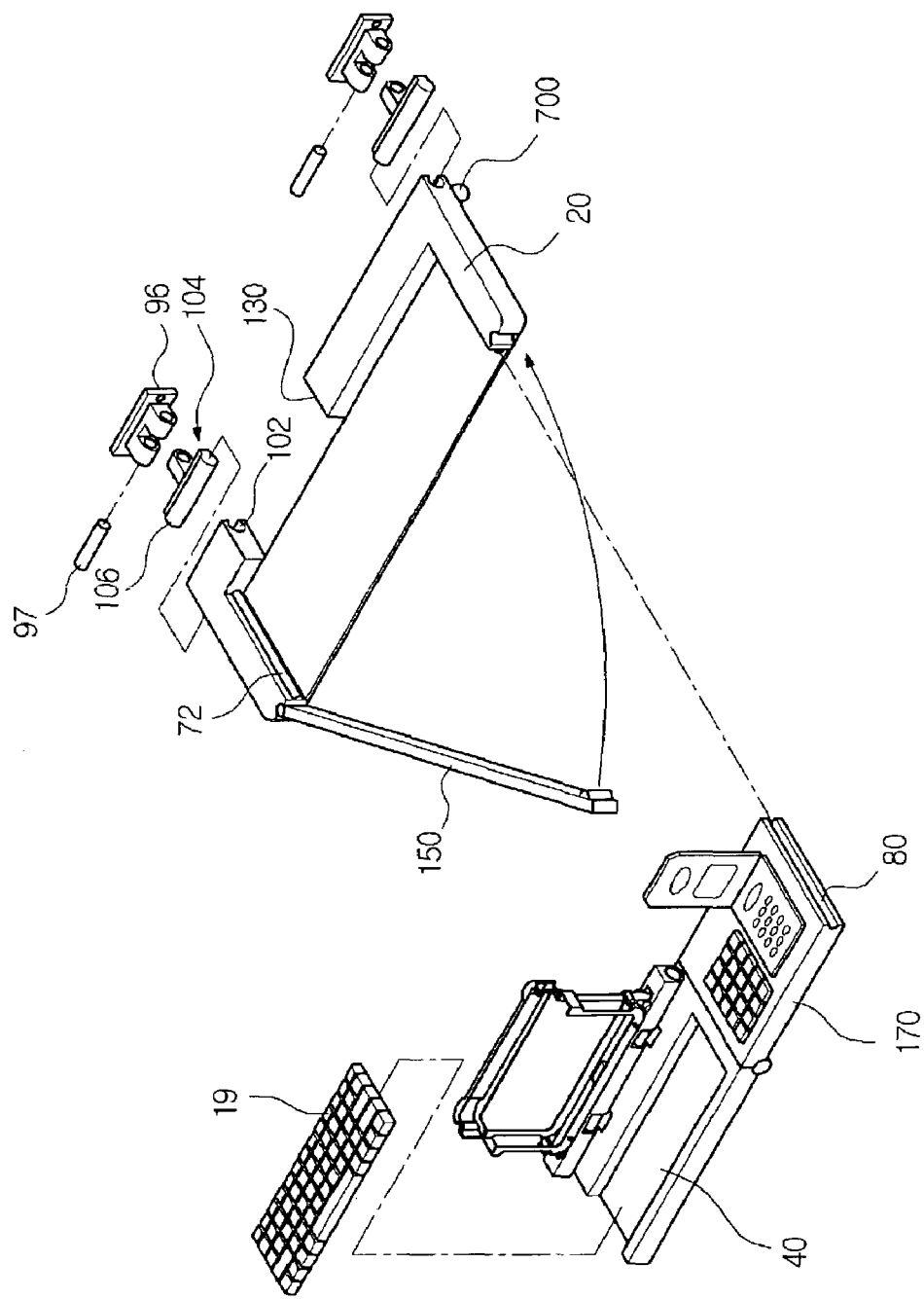
FIG. 32 shows still another embodiment of the present invention including a frame body having a supporting plate.

As shown in FIG. 32, the carrying member 180 may include a keyboard slot 140 into which keyboard is inserted.

In FIG. 33, there shows another type of the carrying member 180. Such carrying member 180 includes a frame portion having a base plate 107, an opening for receiving the display 182, and a locking member 150. One end portion of the locking member 150 is hinged to the frame portion and the other end portion of the locking member 150 engages with the frame portion. A portion of the frame portion is canceled so that the movement of the display may not interfere with the frame portion.

INDUSTRIAL APPLICABILITY

As set forth in the foregoing, with a sun visor according to the present invention, a user can access Internet and handle his or her business in a driver's seat.

For example, in the state where the sun visor is coupled on the ceiling of the car, the monitor is fixed to a desired angle, for example, in the direction to a driver, which supports a hands-free function and an image communication on the monitor.

Also, the sun visor with the keyboard can be attached or detached in an easy manner.

When the sun visor according to the present invention is placed on the steering wheel for handling the user's work, the office equipment with the keyboard is safely mounted on the groove with a buffer spring, such that the office equipment can be protected from the impacts applied from the outside, without any shaking.

Moreover, the sun visor coupling part can be firmly secured on the ceiling, and the ceiling-connected part can be mounted on the sun visor coupling part in a simple manner.

In addition, a portable computer (PDA) is installed in an attachable and detachable manner in the display part of the office equipment, thereby enabling the installation of the portable computer to be easily achieved, and the portable computer is mounted by a guide frame and a support body and rotates by means of a rotary member, thereby enabling the operation thereof to be achieved in any position.

While the present invention has been shown and described with respect to the preferred embodiments, it will be understood by those skilled in the art that various changes and modifications may be made without departing from the spirit and scope of the invention as defined in the following claims.

What is claimed is:

1. A sun visor with an office work apparatus which detachably engages with the sun visor, comprising:
   a frame to which the office work apparatus is detachably mounted;
   a sun visor coupling part operable to be installed to a ceiling of a vehicle, the sun visor coupling part detachably engaging with the frame; and
   an on-wheel mounting member for detachably installing the office work apparatus on a steering wheel of a vehicle;
   wherein the office work apparatus includes a keyboard and a display, the office work apparatus being foldable.

2. The sun visor with an office work apparatus of claim 1, wherein the office work apparatus further includes a camera, a microphone, and a speaker.

3. The sun visor with an office work apparatus of claim 2, wherein the office work apparatus includes a card reader.

4. The sun visor with an office work apparatus of claim 1, wherein the office work apparatus includes a shaft which is provided at both side portions of the office work apparatus and has a disk-shaped portion at the end portion thereof, and wherein the frame includes a slot into which the disk-shaped portion of the shaft is inserted.

5. The sun visor with an office work apparatus of claim 4, wherein the disk-shaped portion is rotatably installed into the slot of the frame.

6. The sun visor with an office work apparatus of claim 1, wherein the office work apparatus further includes a communication equipment mounting stand for carrying a wireless communication device.

* * * * *